United States Patent
Zeine et al.

(10) Patent No.: US 10,498,177 B2
(45) Date of Patent: Dec. 3, 2019

(54) TECHNIQUES FOR WIRELESS POWER TRANSMISSION SYSTEM HANDOFF AND LOAD BALANCING

(71) Applicant: Ossia Inc., Bellevue, WA (US)

(72) Inventors: Hatem Zeine, Bellevue, WA (US); Dale Mayes, Bothell, WA (US)

(73) Assignee: Ossia Inc., Bellevue, WA (US)

( * ) Notice: Subject to any disclaimer, the term of this patent is extended or adjusted under 35 U.S.C. 154(b) by 150 days.

(21) Appl. No.: 15/196,618

(22) Filed: Jun. 29, 2016

(65) Prior Publication Data

US 2017/0005520 A1 Jan. 5, 2017

Related U.S. Application Data

(60) Provisional application No. 62/187,190, filed on Jun. 30, 2015.

(51) Int. Cl.
| | |
|---|---|
| *H02J 7/00* | (2006.01) |
| *H04M 15/00* | (2006.01) |
| *H02J 50/80* | (2016.01) |
| *H02J 50/40* | (2016.01) |
| *H02J 50/20* | (2016.01) |
| *H02J 7/02* | (2016.01) |

(52) U.S. Cl.
CPC ............ *H02J 50/80* (2016.02); *H02J 50/20* (2016.02); *H02J 50/40* (2016.02); *H02J 7/025* (2013.01)

(58) Field of Classification Search
CPC .. H02J 50/80; H02J 50/20; H02J 50/40; H02J 7/025
See application file for complete search history.

(56) References Cited

U.S. PATENT DOCUMENTS

| | | | |
|---|---|---|---|
| 8,618,770 | B2 | 12/2013 | Baarman |
| 2004/0145342 | A1 | 7/2004 | Lyon |

(Continued)

FOREIGN PATENT DOCUMENTS

| | | |
|---|---|---|
| JP | 2013-106515 A | 5/2013 |
| JP | 2015-092804 A | 5/2014 |

(Continued)

OTHER PUBLICATIONS

Notification of Transmittal of the International Search Report and the Written Opinion of the International Searching Authority, or the Declaration received in International Application No. PCT/US2016/040343 dated Sep. 14, 2016, 11 pages.
Notification of Transmittal of the International Search Report and the Written Opinion of the International Searching Authority, or the Declaration received in International Application No. PCT/US2016/040319 dated Sep. 26, 2016, 12 pages.

(Continued)

*Primary Examiner* — Kenneth B Wells

(57) ABSTRACT

Techniques are described herein for load balancing wireless power receiver clients over multiple wireless power transmission systems in a wireless power delivery environment. In some embodiments, a method is described. The method includes identifying transmitter load information associated with at least two wireless power transmission systems of the multiple wireless power transmission systems, detecting a load imbalance between the at least two wireless power transmission systems based, at least in part, on the transmitter load information, and determining one or more operations for improving the load imbalance. The method further includes directing one or more of the at least two wireless power transmission systems to perform the one or more operations.

20 Claims, 14 Drawing Sheets

(56) References Cited

U.S. PATENT DOCUMENTS

| | | |
|---|---|---|
| 2005/0136854 A1 | 6/2005 | Akizuki et al. |
| 2006/0113955 A1 | 6/2006 | Nunally |
| 2010/0181961 A1 | 7/2010 | Novak et al. |
| 2010/0315045 A1 | 12/2010 | Leine |
| 2010/0323616 A1 | 12/2010 | Von Novak et al. |
| 2011/0115432 A1 | 5/2011 | El-Maleh et al. |
| 2012/0326658 A1* | 12/2012 | Kim .................... H02J 7/00 320/108 |
| 2013/0137455 A1 | 5/2013 | Xia et al. |
| 2013/0214615 A1 | 8/2013 | Taleb et al. |
| 2014/0217967 A1 | 8/2014 | Leine et al. |
| 2014/0375253 A1 | 12/2014 | Leabman et al. |
| 2014/0375256 A1 | 12/2014 | Lee et al. |
| 2015/0326073 A1* | 11/2015 | McKibben ............ H02J 7/02 320/108 |

FOREIGN PATENT DOCUMENTS

| | | |
|---|---|---|
| WO | 2014/034118 A1 | 3/2014 |
| WO | 2014/121296 A1 | 8/2014 |
| WO | 2015/161723 A1 | 10/2015 |

OTHER PUBLICATIONS

Japanese Patent Application No. 2017-566633, Office Action, 7 pages, dated Nov. 13, 2018.
European Patent Application No. EP 16818765.6, Extended European Search Report, 8 pages, dated Dec. 10, 2018.
Japanese Patent Application No. 2017-566633, Office Action, 9 pages, dated May 28, 2019.

* cited by examiner

TECHNIQUES FOR WIRELESS POWER TRANSMISSION SYSTEM HANDOFF AND LOAD BALANCING

CROSS-REFERENCE TO RELATED APPLICATIONS

This application claims priority to and benefit from U.S. Provisional Patent Application Ser. No. 62/187,190 titled "SYSTEMS AND METHODS FOR IMPROVING WIRELESS CHARGING EFFICIENCY" filed on Jun. 30, 2015, which is expressly incorporated by reference herein.

TECHNICAL FIELD

The technology described herein relates generally to the field of wireless power transmission and, more specifically, to techniques for wireless power transmission system handoff and load balancing.

BACKGROUND

Many electronic devices are powered by batteries. Rechargeable batteries are often used to avoid the cost of replacing conventional dry-cell batteries and to conserve precious resources. However, recharging batteries with conventional rechargeable battery chargers requires access to an alternating current (AC) power outlet, which is sometimes not available or not convenient. It would, therefore, be desirable to derive power for electronics wirelessly.

Accordingly, a need exists for technology that overcomes the problem demonstrated above, as well as one that provides additional benefits. The examples provided herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
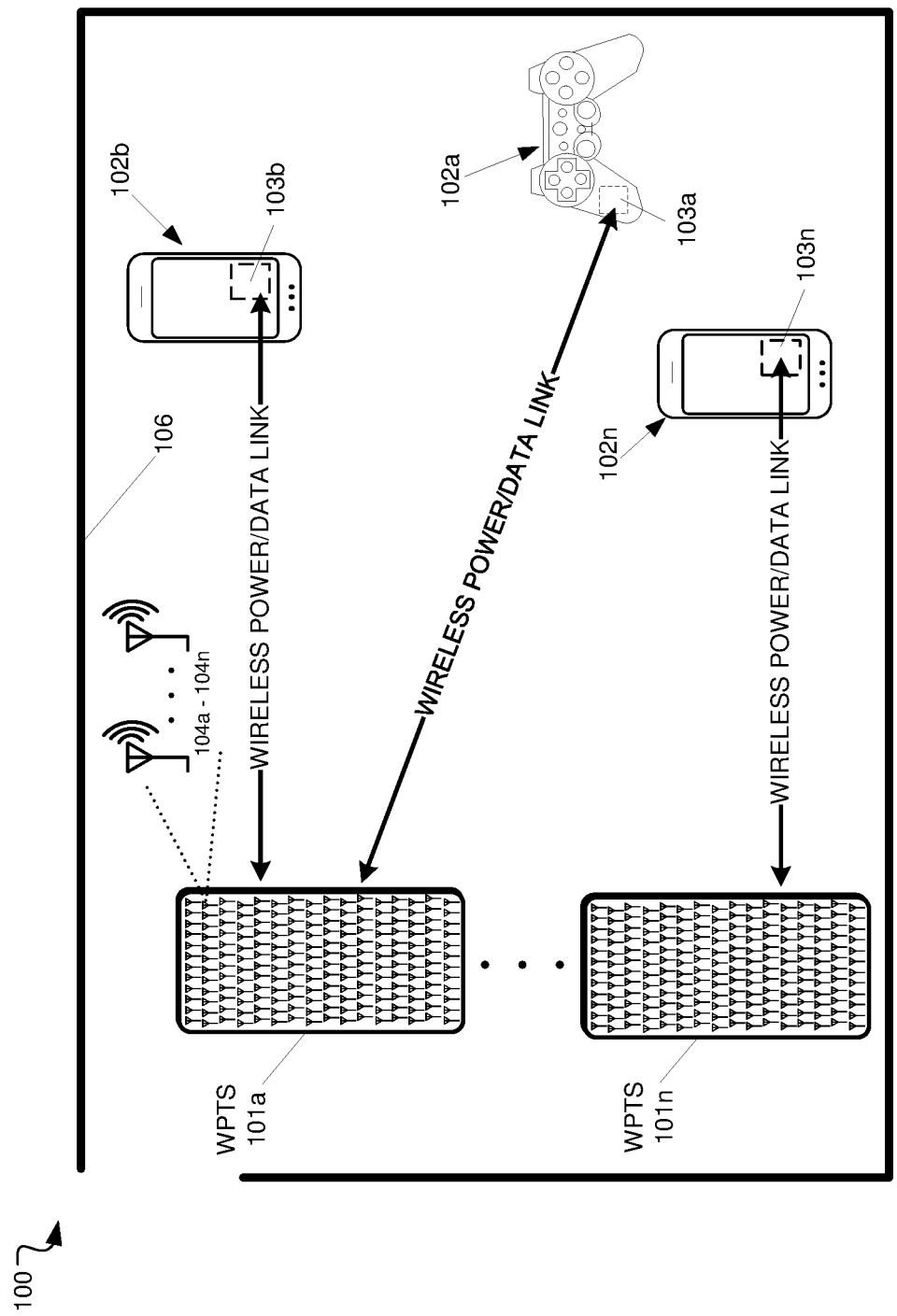
FIG. 1 depicts a block diagram including an example wireless power delivery environment illustrating wireless power delivery from one or more wireless power transmission systems to various wireless devices within the wireless power delivery environment in accordance with some embodiments.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

I. Wireless Power Transmission Systems Over/Architecture

FIG. 1 depicts a block diagram including an example wireless power delivery environment 100 illustrating wireless power delivery from one or more wireless power transmission systems (WPTS) 101$a$-$n$ (also referred to as "wireless power delivery systems", "antenna array systems" and "wireless chargers") to various wireless devices 102$a$-$n$ within the wireless power delivery environment 100, according to some embodiments. More specifically, FIG. 1 illustrates an example wireless power delivery environment 100 in which wireless power and/or data can be delivered to available wireless devices 102$a$-102$n$ having one or more wireless power receiver clients 103$a$-103$n$ (also referred to herein as "clients" and "wireless power receivers"). The wireless power receiver clients are configured to receive and process wireless power from one or more wireless power transmission systems 101$a$-101$n$. Components of an example wireless power receiver client 103 are shown and discussed in greater detail with reference to FIG. 4.

As shown in the example of FIG. 1, the wireless devices 102$a$-102$n$ include mobile phone devices and a wireless game controller. However, the wireless devices 102$a$-102$n$ can be any device or system that needs power and is capable of receiving wireless power via one or more integrated power receiver clients 103$a$-103$n$. As discussed herein, the one or more integrated power receiver clients receive and process power from one or more wireless power transmission systems 101$a$-101$n$ and provide the power to the wireless devices 102$a$-102$n$ (or internal batteries of the wireless devices) for operation thereof.

Each wireless power transmission system 101 can include multiple antennas 104$a$-$n$, e.g., an antenna array including hundreds or thousands of antennas, which are capable of delivering wireless power to wireless devices 102. In some embodiments, the antennas are adaptively-phased radio frequency (RF) antennas. The wireless power transmission system 101 is capable of determining the appropriate phases with which to deliver a coherent power transmission signal to the power receiver clients 103. The array is configured to emit a signal (e.g., continuous wave or pulsed power transmission signal) from multiple antennas at a specific phase relative to each other. It is appreciated that use of the term "array" does not necessarily limit the antenna array to any specific array structure. That is, the antenna array does not need to be structured in a specific "array" form or geometry. Furthermore, as used herein the term "array" or "array system" may be used to include related and peripheral circuitry for signal generation, reception and transmission, such as radios, digital logic and modems. In some embodiments, the wireless power transmission system 101 can have an embedded Wi-Fi hub for data communications via one or more antennas or transceivers.

The wireless devices 102 can include one or more receive power clients 103. As illustrated in the example of FIG. 1, power delivery antennas 104$a$-104$n$ are shown. The power delivery antennas 104$a$ are configured to provide delivery of wireless radio frequency power in the wireless power delivery environment. In some embodiments, one or more of the power delivery antennas 104$a$-104$n$ can alternatively or additionally be configured for data communications in addition to or in lieu of wireless power delivery. The one or more data communication antennas are configured to send data communications to and receive data communications from the power receiver clients 103$a$-103$n$ and/or the wireless devices 102$a$-102$n$. In some embodiments, the data communication antennas can communicate via Bluetooth™, Wi-Fi™, ZigBee™, etc. Other data communication protocols are also possible.

Each power receiver client 103$a$-103$n$ includes one or more antennas (not shown) for receiving signals from the wireless power transmission systems 101$a$-101$n$. Likewise, each wireless power transmission system 101$a$-101$n$ includes an antenna array having one or more antennas and/or sets of antennas capable of emitting continuous wave or discrete (pulse) signals at specific phases relative to each other. As discussed above, each of the wireless power transmission systems 101$a$-101$n$ is capable of determining the appropriate phases for delivering the coherent signals to the power receiver clients 102$a$-102$n$. For example, in some embodiments, coherent signals can be determined by computing the complex conjugate of a received beacon (or calibration) signal at each antenna of the array such that the coherent signal is phased for delivering power to the particular power receiver client that transmitted the beacon (or calibration) signal.

Although not illustrated, each component of the environment, e.g., wireless device, wireless power transmission system, etc., can include control and synchronization mechanisms, e.g., a data communication synchronization module. The wireless power transmission systems 101$a$-101$n$ can be connected to a power source such as, for example, a power outlet or source connecting the wireless power transmission systems to a standard or primary alternating current (AC) power supply in a building. Alternatively, or additionally, one or more of the wireless power transmission systems 101$a$-101$n$ can be powered by a battery or via other mechanisms, e.g., solar cells, etc.

The power receiver clients 102$a$-102$n$ and/or the wireless power transmission systems 101$a$-101$n$ are configured to operate in a multipath wireless power delivery environment. That is, the power receiver clients 102$a$-102$n$ and the wireless power transmission systems 101$a$-101$n$ are configured to utilize reflective objects 106 such as, for example, walls or other RF reflective obstructions within range to transmit beacon (or calibration) signals and/or receive wireless power and/or data within the wireless power delivery environment. The reflective objects 106 can be utilized for multi-directional signal communication regardless of whether a blocking object is in the line of sight between the wireless power transmission system and the power receiver client.

As described herein, each wireless device 102a-102n can be any system and/or device, and/or any combination of devices/systems that can establish a connection with another device, a server and/or other systems within the example environment 100. In some embodiments, the wireless devices 102a-102n include displays or other output functionalities to present data to a user and/or input functionalities to receive data from the user. By way of example, a wireless device 102 can be, but is not limited to, a video game controller, a server desktop, a desktop computer, a computer cluster, a mobile computing device such as a notebook, a laptop computer, a handheld computer, a mobile phone, a smart phone, a PDA, a Blackberry device, a Treo, and/or an iPhone, etc. By way of example and not limitation, the wireless device 102 can also be any wearable device such as watches, necklaces, rings or even devices embedded on or within the customer. Other examples of a wireless device 102 include, but are not limited to, safety sensors (e.g., fire or carbon monoxide), electric toothbrushes, electronic door lock/handles, electric light switch controller, electric shavers, etc.

Although not illustrated in the example of FIG. 1, the wireless power transmission system 101 and the power receiver clients 103a-103n can each include a data communication module for communication via a data channel. Alternatively, or additionally, the power receiver clients 103a-103n can direct the wireless devices 102a-102n to communicate with the wireless power transmission system via existing data communications modules. In some embodiments the beacon signal, which is primarily referred to herein as a continuous waveform, can alternatively or additionally take the form of a modulated signal.

Figure 2:
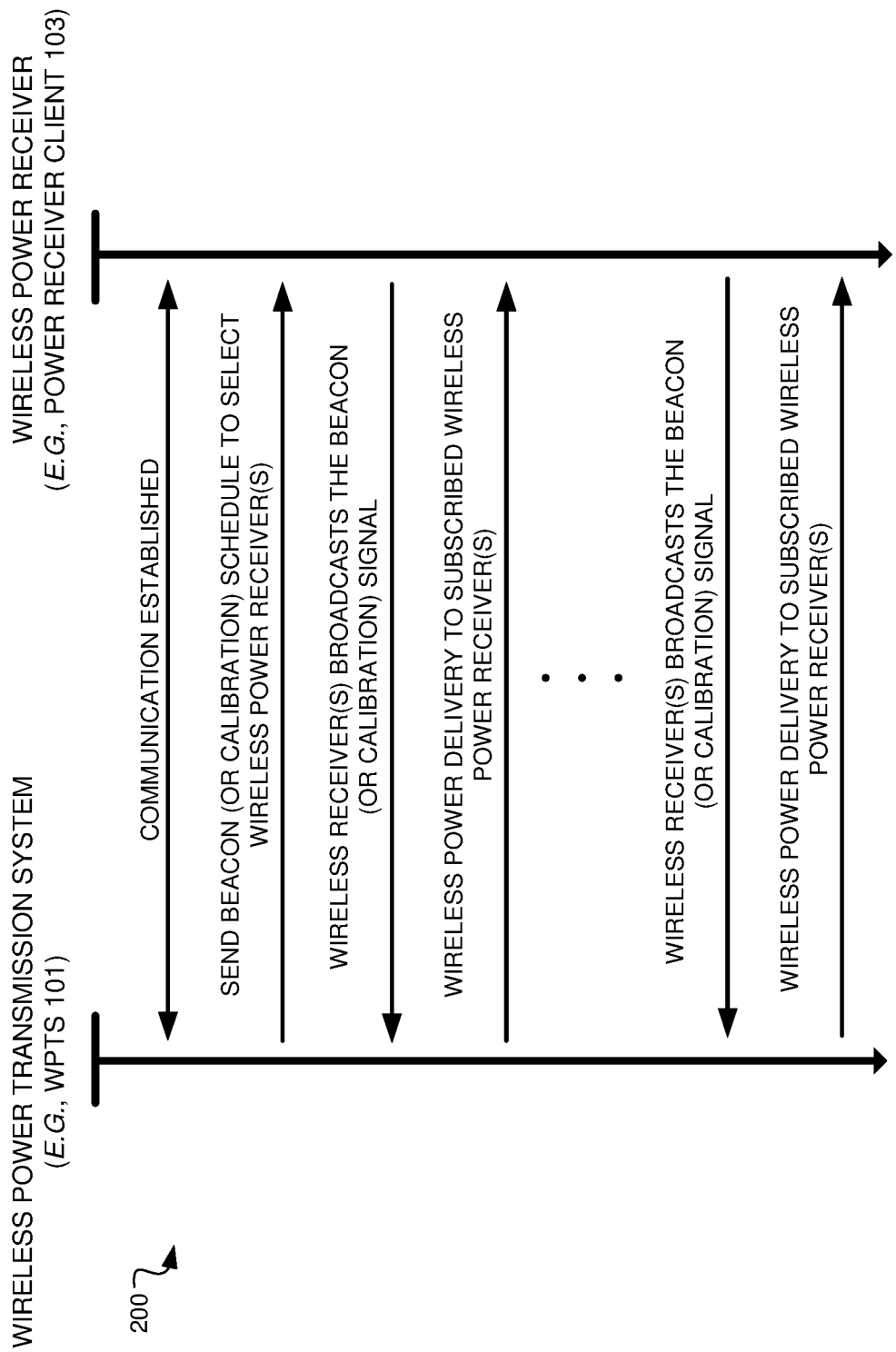
FIG. 2 depicts a sequence diagram illustrating example operations between a wireless power transmission system and a wireless receiver client for commencing wireless power delivery in accordance with some embodiments.

FIG. 2 is a sequence diagram 200 illustrating example operations between a wireless power delivery system (e.g., WPTS 101) and a wireless power receiver client (e.g., wireless power receiver client 103) for establishing wireless power delivery in a multipath wireless power delivery, according to an embodiment. Initially, communication is established between the wireless power transmission system 101 and the power receiver client 103. The initial communication can be, for example, a data communication link that is established via one or more antennas 104 of the wireless power transmission system 101. As discussed, in some embodiments, one or more of the antennas 104a-104n can be data antennas, wireless power transmission antennas, or dual-purpose data/power antennas. Various information can be exchanged between the wireless power transmission system 101 and the wireless power receiver client 103 over this data communication channel. For example, wireless power signaling can be time sliced among various clients in a wireless power delivery environment. In such cases, the wireless power transmission system 101 can send beacon schedule information, e.g., Beacon Beat Schedule (BBS) cycle, power cycle information, etc., so that the wireless power receiver client 103 knows when to transmit (broadcast) its beacon signals and when to listen for power, etc.

Continuing with the example of FIG. 2, the wireless power transmission system 101 selects one or more wireless power receiver clients for receiving power and sends the beacon schedule information to the select power receiver clients 103. The wireless power transmission system 101 can also send power transmission scheduling information so that the power receiver client 103 knows when to expect (e.g., a window of time) wireless power from the wireless power transmission system. The power receiver client 103 then generates a beacon (or calibration) signal and broadcasts the beacon during an assigned beacon transmission window (or time slice) indicated by the beacon schedule information, e.g., Beacon Beat Schedule (BBS) cycle. As discussed herein, the wireless power receiver client 103 includes one or more antennas (or transceivers) which have a radiation and reception pattern in three-dimensional space proximate to the wireless device 102 in which the power receiver client 103 is embedded.

The wireless power transmission system 101 receives the beacon from the power receiver client 103 and detects and/or otherwise measures the phase (or direction) from which the beacon signal is received at multiple antennas. The wireless power transmission system 101 then delivers wireless power to the power receiver client 104 from the multiple antennas 103 based on the detected or measured phase (or direction) of the received beacon at each of the corresponding antennas. In some embodiments, the wireless power transmission system 101 determines the complex conjugate of the measured phase of the beacon and uses the complex conjugate to determine a transmit phase that configures the antennas for delivering and/or otherwise directing wireless power to the power receiver client 103 via the same path over which the beacon signal was received from the power receiver client 103.

In some embodiments, the wireless power transmission system 101 includes many antennas; one or more of which are used to deliver power to the power receiver client 103. The wireless power transmission system 101 can detect and/or otherwise determine or measure phases at which the beacon signals are received at each antenna. The large number of antennas may result in different phases of the beacon signal being received at each antenna of the wireless power transmission system 101. As discussed above, the wireless power transmission system 101 can determine the complex conjugate of the beacon signals received at each antenna. Using the complex conjugates, one or more antennas may emit a signal that takes into account the effects of the large number of antennas in the wireless power transmission system 101. In other words, the wireless power transmission system 101 can emit a wireless power transmission signal from the one or more antennas in such a way as to create an aggregate signal from the one or more of the antennas that approximately recreates the waveform of the beacon in the opposite direction. Said another way, the wireless power transmission system 101 can deliver wireless RF power to the client device via the same paths over which the beacon signal is received at the wireless power transmission system 101. These paths can utilize reflective objects 106 within the environment. Additionally, the wireless power transmission signals can be simultaneously transmitted from the wireless power transmission system 101 such that the wireless power transmission signals collectively match the antenna radiation and reception pattern of the client device in a three-dimensional (3D) space proximate to the client device.

As shown, the beacon (or calibration) signals can be periodically transmitted by power receiver clients 103 within the power delivery environment according to, for example, the BBS, so that the wireless power transmission system 101 can maintain knowledge and/or otherwise track the location of the power receiver clients 103 in the wireless power delivery environment. The process of receiving beacon signals from a wireless power receiver client at the wireless power transmission system and, in turn, responding with wireless power directed to that particular client is referred to herein as retrodirective wireless power delivery.

Furthermore, as discussed herein, wireless power can be delivered in power cycles defined by power schedule information. A more detailed example of the signaling required to commence wireless power delivery is described now with reference to FIG. 3.

Figure 3:
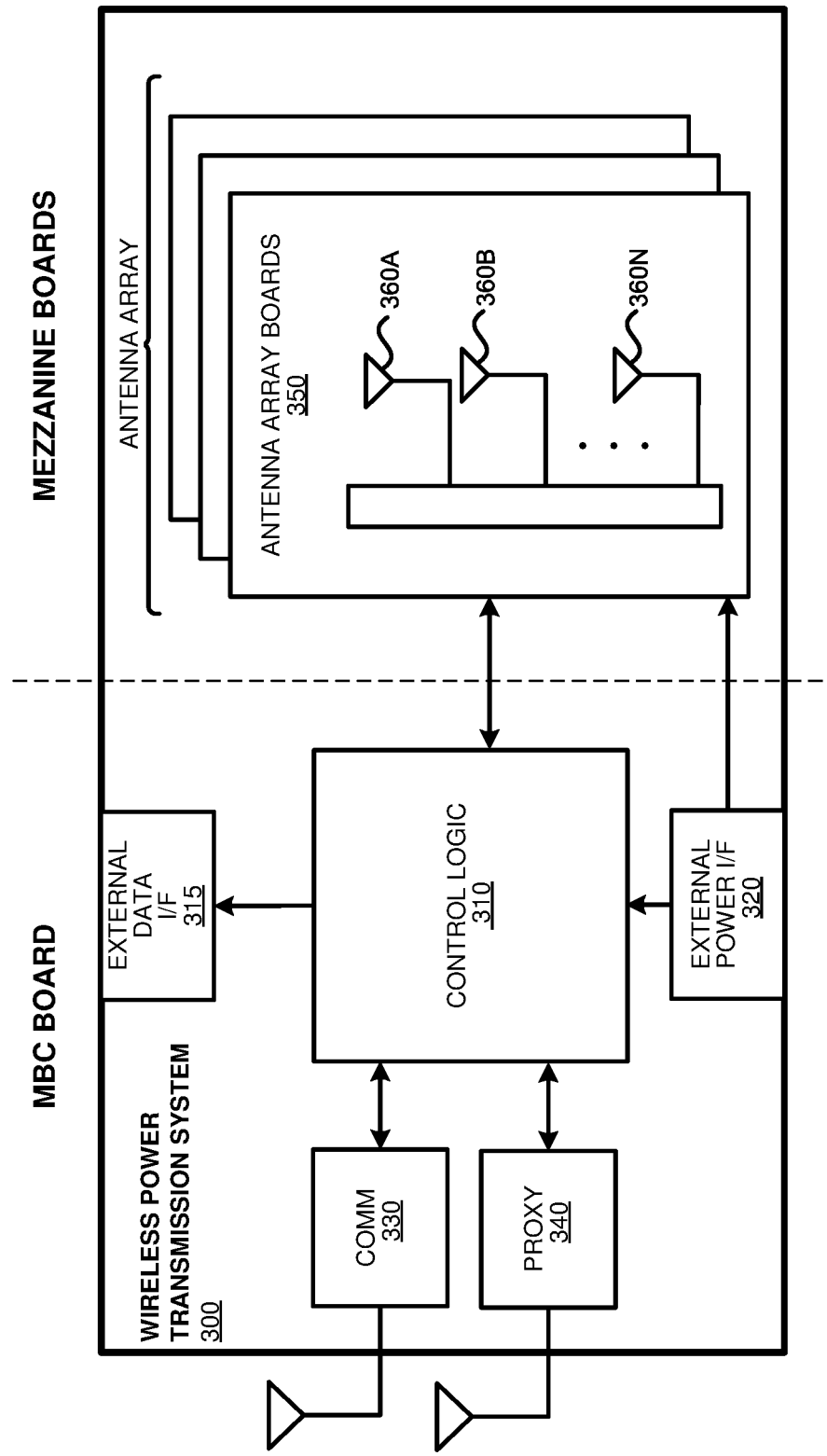
FIG. 3 depicts a block diagram illustrating example components of a wireless power transmission system in accordance with some embodiments.

FIG. 3 is a block diagram illustrating example components of a wireless power transmission system 300, in accordance with an embodiment. As illustrated in the example of FIG. 3, the wireless charger 300 includes a master bus controller (MBC) board and multiple mezzanine boards that collectively comprise the antenna array. The MBC includes control logic 310, an external data interface (I/F) 315, an external power interface (I/F) 320, a communication block 330 and proxy 340. The mezzanine (or antenna array boards 350) each include multiple antennas 360a-360n. Some or all of the components can be omitted in some embodiments. Additional components are also possible. For example, in some embodiments only one of communication block 330 or proxy 340 may be included.

The control logic 310 is configured to provide control and intelligence to the array components. The control logic 310 may comprise one or more processors, FPGAs, memory units, etc., and direct and control the various data and power communications. The communication block 330 can direct data communications on a data carrier frequency, such as the base signal clock for clock synchronization. The data communications can be Bluetooth™, Wi-Fi™, ZigBee™, etc., including combinations or variations thereof. Likewise, the proxy 340 can communicate with clients via data communications as discussed herein. The data communications can be, by way of example and not limitation, Bluetooth™, Wi-Fi™, ZigBee™, etc. Other communication protocols are possible.

In some embodiments, the control logic 310 can also facilitate and/or otherwise enable data aggregation for Internet of Things (IoT) devices. In some embodiments, wireless power receiver clients can access, track and/or otherwise obtain IoT information about the device in which the wireless power receiver client is embedded and provide that IoT information to the wireless power transmission system 300 over a data connection. This IoT information can be provided via an external data interface 315 to a central or cloud-based system (not shown) where the data can be aggregated, processed, etc. For example, the central system can process the data to identify various trends across geographies, wireless power transmission systems, environments, devices, etc. In some embodiments, the aggregated data and or the trend data can be used to improve operation of the devices via remote updates, etc. Alternatively, or additionally, in some embodiments, the aggregated data can be provided to third party data consumers. In this manner, the wireless power transmission system acts as a Gateway or Enabler for the IoTs. By way of example and not limitation, the IoT information can include capabilities of the device in which the wireless power receiver client is embedded, usage information of the device, power levels of the device, information obtained by the device or the wireless power receiver client itself, e.g., via sensors, etc.

The external power interface 320 is configured to receive external power and provide the power to various components. In some embodiments, the external power interface 320 may be configured to receive a standard external 24 Volt power supply. In other embodiments, the external power interface 320 can be, for example, 120/240 Volt AC mains to an embedded DC power supply which sources the required 12/24/48 Volt DC to provide the power to various components. Alternatively, the external power interface could be a DC supply which sources the required 12/24/48 Volts DC. Alternative configurations are also possible.

In operation, the master bus controller (MBC), which controls the wireless power transmission system 300, receives power from a power source and is activated. The MBC then activates the proxy antenna elements on the wireless power transmission system and the proxy antenna elements enter a default "discovery" mode to identify available wireless receiver clients within range of the wireless power transmission system. When a client is found, the antenna elements on the wireless power transmission system power on, enumerate, and (optionally) calibrate.

The MBC then generates beacon transmission scheduling information and power transmission scheduling information during a scheduling process. The scheduling process includes selection of power receiver clients. For example, the MBC can select power receiver clients for power transmission and generate a Beacon Beat Schedule (BBS) cycle and a Power Schedule (PS) for the selected wireless power receiver clients. As discussed herein, the power receiver clients can be selected based on their corresponding properties and/or requirements.

In some embodiments, the MBC can also identify and/or otherwise select available clients that will have their status queried in the Client Query Table (CQT). Clients that are placed in the CQT are those on "standby", e.g., not receiving a charge. The BBS and PS are calculated based on vital information about the clients such as, for example, battery status, current activity/usage, how much longer the client has until it runs out of power, priority in terms of usage, etc.

The Proxy AE broadcasts the BBS to all clients. As discussed herein, the BBS indicates when each client should send a beacon. Likewise, the PS indicates when and to which clients the array should send power to and when clients should listen for wireless power. Each client starts broadcasting its beacon and receiving power from the array per the BBS and PS. The Proxy can concurrently query the Client Query Table to check the status of other available clients. In some embodiments, a client can only exist in the BBS or the CQT (e.g., waitlist), but not in both. The information collected in the previous step continuously and/or periodically updates the BBS cycle and/or the PS.

Figure 4:
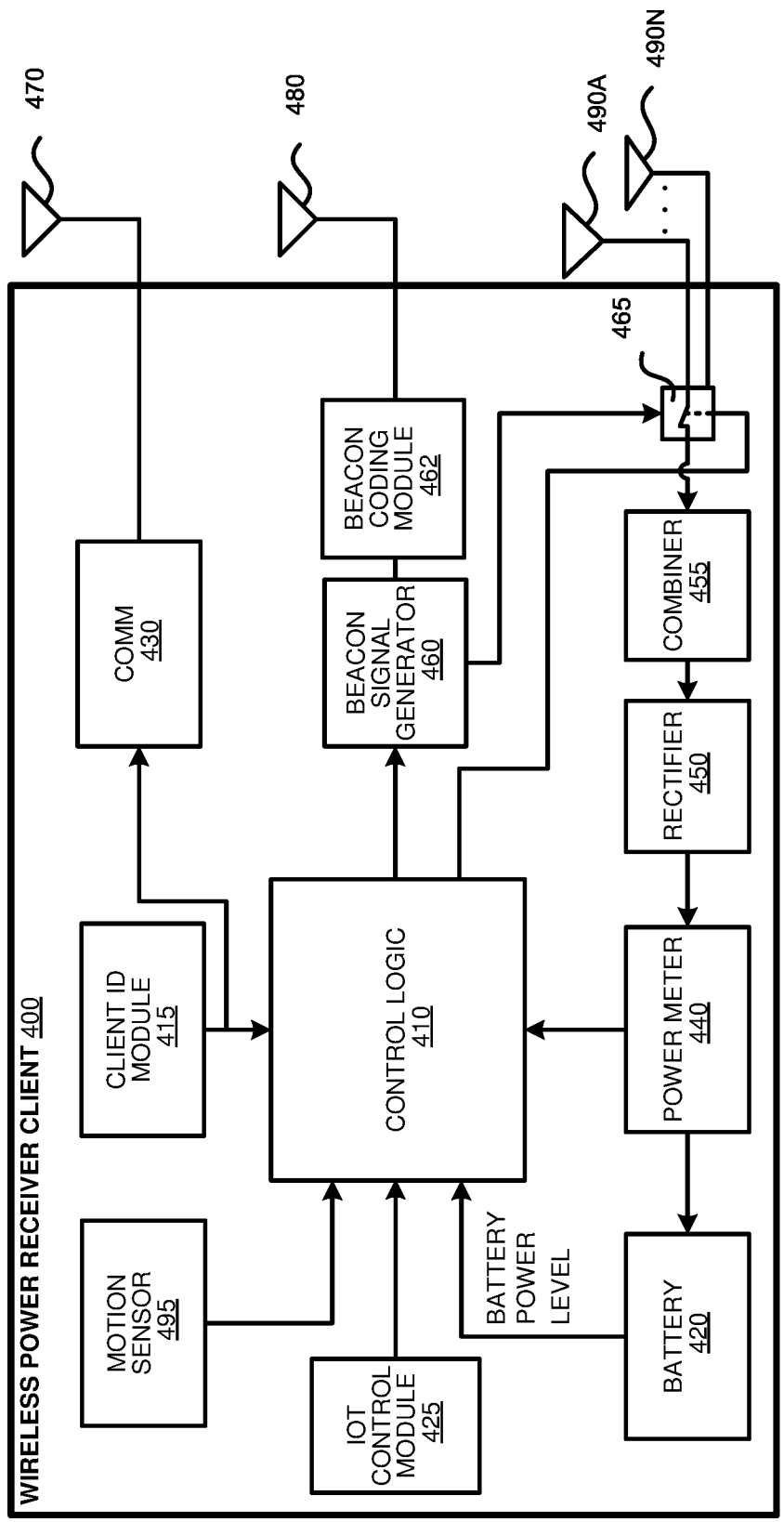
FIG. 4 depicts a block diagram illustrating example components of a wireless power receiver client in accordance with some embodiments.

FIG. 4 is a block diagram illustrating example components of a wireless power receiver client, in accordance with some embodiments. As illustrated in the example of FIG. 4, the receiver 400 includes control logic 410, battery 420, an IoT control module 425, communication block 430 and associated antenna 470, power meter 440, rectifier 450, a combiner 455, beacon signal generator 460, beacon coding unit 462 and an associated antenna 480, and switch 465 connecting the rectifier 450 or the beacon signal generator 460 to one or more associated antennas 490a-n. Some or all of the components can be omitted in some embodiments. For example, in some embodiments, the wireless power receiver client does not include its own antennas but instead utilizes and/or otherwise shares one or more antennas (e.g., Wi-Fi antenna) of the wireless device in which the wireless power receiver client is embedded. Moreover, in some embodiments, the wireless power receiver client may include a single antenna that provides data transmission functionality as well as power/data reception functionality. Additional components are also possible.

A combiner 455 receives and combines the received power transmission signals from the power transmitter in the event that the receiver 400 has more than one antenna. The combiner can be any combiner or divider circuit that is configured to achieve isolation between the output ports while maintaining a matched condition. For example, the combiner 455 can be a Wilkinson Power Divider circuit. The rectifier 450 receives the combined power transmission signal from the combiner 455, if present, which is fed through the power meter 440 to the battery 420 for charging. In other embodiments, each antenna's power path can have its own rectifier 450 and the DC power out of the rectifiers is combined prior to feeding the power meter 440. The power meter 440 can measure the received power signal strength and provides the control logic 410 with this measurement.

Battery 420 can include protection circuitry and/or monitoring functions. Additionally, the battery 420 can include one or more features, including, but not limited to, current limiting, temperature protection, over/under voltage alerts and protection, and coulomb monitoring.

The control logic 410 can receive the battery power level from the battery 420 itself. The control logic 410 may also transmit/receive via the communication block 430 a data signal on a data carrier frequency, such as the base signal clock for clock synchronization. The beacon signal generator 460 generates the beacon signal, or calibration signal, transmits the beacon signal using either the antenna 480 or 490 after the beacon signal is encoded.

It may be noted that, although the battery 420 is shown as charged by, and providing power to, the receiver 400, the receiver may also receive its power directly from the rectifier 450. This may be in addition to the rectifier 450 providing charging current to the battery 420, or in lieu of providing charging. Also, it may be noted that the use of multiple antennas is one example of implementation and the structure may be reduced to one shared antenna.

In some embodiments, the control logic 410 and/or the IoT control module 425 can communicate with and/or otherwise derive IoT information from the device in which the wireless power receiver client 400 is embedded. Although not shown, in some embodiments, the wireless power receiver client 400 can have one or more data connections (wired or wireless) with the device in which the wireless power receiver client 400 is embedded over which IoT information can be obtained. Alternatively, or additionally, IoT information can be determined and/or inferred by the wireless power receiver client 400, e.g., via one or more sensors. As discussed above, the IoT information can include, but is not limited to, information about the capabilities of the device in which the wireless power receiver client is embedded, usage information of the device in which the wireless power receiver client is embedded, power levels of the battery or batteries of the device in which the wireless power receiver client is embedded, and/or information obtained or inferred by the device in which the wireless power receiver client is embedded or the wireless power receiver client itself, e.g., via sensors, etc.

In some embodiments, a client identifier (ID) module 415 stores a client ID that can uniquely identify the power receiver client in a wireless power delivery environment. For example, the ID can be transmitted to one or more wireless power transmission systems when communication is established. In some embodiments, power receiver clients may also be able to receive and identify other power receiver clients in a wireless power delivery environment based on the client ID.

An optional motion sensor 495 can detect motion and signal the control logic 410 to act accordingly. For example, a device receiving power may integrate motion detection mechanisms such as accelerometers or equivalent mechanisms to detect motion. Once the device detects that it is in motion, it may be assumed that it is being handled by a user, and would trigger a signal to the array either to stop transmitting power, or to lower the power transmitted to the device. In some embodiments, when a device is used in a moving environment like a car, train or plane, the power might only be transmitted intermittently or at a reduced level unless the device is critically low on power.

Figure 5A:
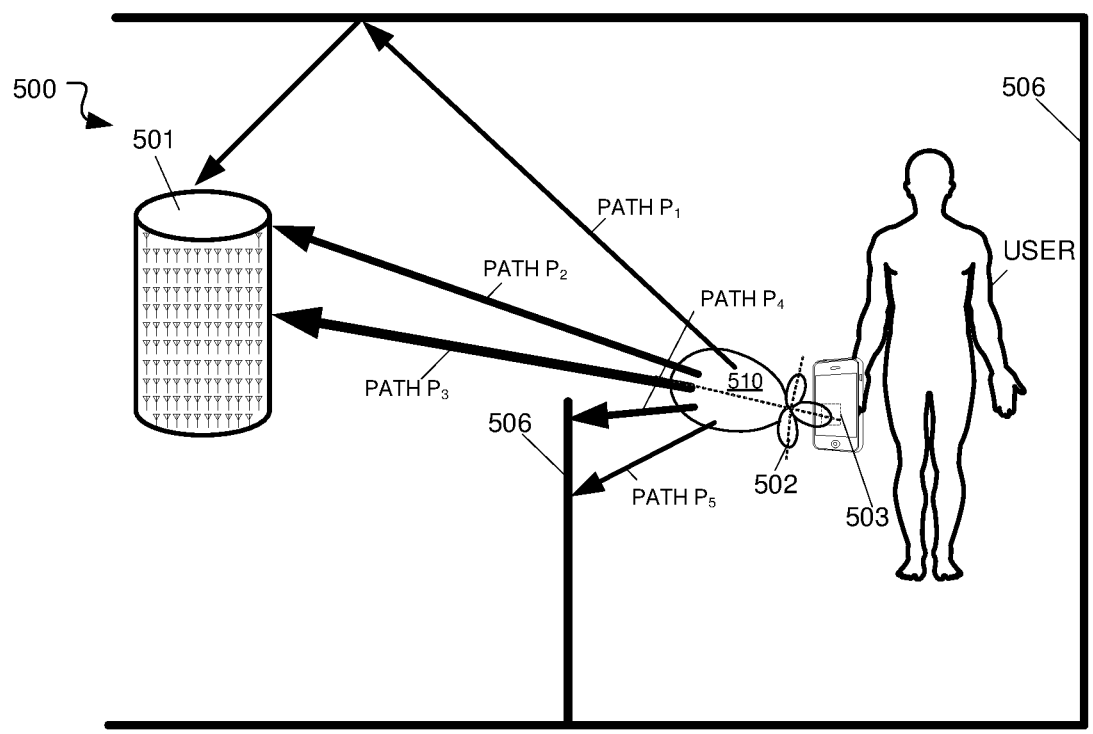
FIGS. 5A and 5B depict diagrams illustrating an example multipath wireless power delivery environment in accordance with some embodiments.
Figure 5B:
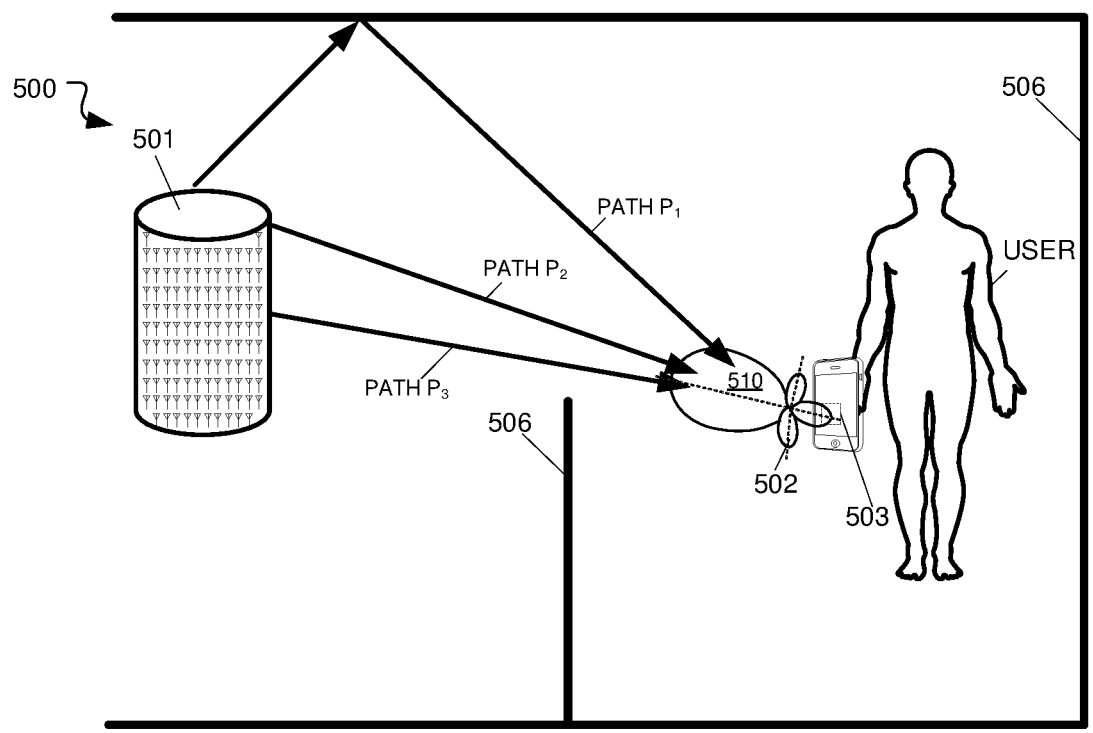

FIGS. 5A and 5B depict diagrams illustrating an example multipath wireless power delivery environment 500, according to some embodiments. The multipath wireless power delivery environment 500 includes a user operating a wireless device 502 including one or more wireless power receiver clients 503. The wireless device 502 and the one or more wireless power receiver clients 503 can be wireless device 102 of FIG. 1 and wireless power receiver client 103 of FIG. 1 or wireless power receiver client 400 of FIG. 4, respectively, although alternative configurations are possible. Likewise, wireless power transmission system 501 can be wireless power transmission system 101 FIG. 1 or wireless power transmission system 300 of FIG. 3, although alternative configurations are possible. The multipath wireless power delivery environment 500 includes reflective objects 506 and various absorptive objects, e.g., users, or humans, furniture, etc.

Wireless device 502 includes one or more antennas (or transceivers) that have a radiation and reception pattern 510 in three-dimensional space proximate to the wireless device 102. The one or more antennas (or transceivers) can be wholly or partially included as part of the wireless device 102 and/or the wireless power receiver client (not shown). For example, in some embodiments one or more antennas, e.g., Wi-Fi, Bluetooth, etc. of the wireless device 502 can be utilized and/or otherwise shared for wireless power reception. As shown in the example of FIGS. 5A and 5B, the radiation and reception pattern 510 comprises a lobe pattern with a primary lobe and multiple side lobes. Other patterns are also possible.

The wireless device 502 transmits a beacon (or calibration) signal over multiple paths to the wireless power transmission system 501. As discussed herein, the wireless device 502 transmits the beacon in the direction of the radiation and reception pattern 510 such that the strength of the received beacon signal by the wireless power transmission system, e.g., RSSI, depends on the radiation and reception pattern 510. For example, beacon signals are not transmitted where there are nulls in the radiation and reception pattern 510 and beacon signals are the strongest at the peaks in the radiation and reception pattern 510, e.g., peak of the primary lobe. As shown in the example of FIG. 5A, the wireless device 502 transmits beacon signals over five paths P1-P5. Paths P4 and P5 are blocked by reflective and/or absorptive object 506. The wireless power transmission system 501 receives beacon signals of increasing strengths via paths P1-P3. The bolder lines indicate stronger signals. In some embodiments the beacon signals are directionally transmitted in this manner to, for example, avoid unnecessary RF energy exposure to the user.

A fundamental property of antennas is that the receiving pattern (sensitivity as a function of direction) of an antenna when used for receiving is identical to the far-field radiation pattern of the antenna when used for transmitting. This is a consequence of the reciprocity theorem in electromagnetics. As shown in the example of FIGS. 5A and 5B, the radiation and reception pattern 510 is a three-dimensional lobe shape.

However, the radiation and reception pattern 510 can be any number of shapes depending on the type or types, e.g., horn antennas, simple vertical antenna, etc. used in the antenna design. For example, the radiation and reception pattern 510 can comprise various directive patterns. Any number of different antenna radiation and reception patterns are possible for each of multiple client devices in a wireless power delivery environment.

Referring again to FIG. 5A, the wireless power transmission system 501 receives the beacon (or calibration) signal via multiple paths P1-P3 at multiple antennas or transceivers. As shown, paths P2 and P3 are direct line of sight paths while path P1 is a non-line of sight path. Once the beacon (or calibration) signal is received by the wireless power transmission system 501, the power transmission system 501 processes the beacon (or calibration) signal to determine one or more receive characteristics of the beacon signal at each of the multiple antennas. For example, among other operations, the wireless power transmission system 501 can measure the phases at which the beacon signal is received at each of the multiple antennas or transceivers.

The wireless power transmission system 501 processes the one or more receive characteristics of the beacon signal at each of the multiple antennas to determine or measure one or more wireless power transmit characteristics for each of the multiple RF transceivers based on the one or more receive characteristics of the beacon (or calibration) signal as measured at the corresponding antenna or transceiver. By way of example and not limitation, the wireless power transmit characteristics can include phase settings for each antenna or transceiver, transmission power settings, etc.

As discussed herein, the wireless power transmission system 501 determines the wireless power transmit characteristics such that, once the antennas or transceivers are configured, the multiple antennas or transceivers are operable to transit a wireless power signal that matches the client radiation and reception pattern in the three-dimensional space proximate to the client device. FIG. 5B illustrates the wireless power transmission system 501 transmitting wireless power via paths P1-P3 to the wireless device 502. Advantageously, as discussed herein, the wireless power signal matches the client radiation and reception pattern 510 in the three-dimensional space proximate to the client device. Said another way, the wireless power transmission system will transmit the wireless power signals in the direction in which the wireless power receiver has maximum gain, e.g., will receive the most wireless power. As a result, no signals are sent in directions in which the wireless power receiver cannot receive, e.g., nulls and blockages. In some embodiments, the wireless power transmission system 501 measures the RSSI of the received beacon signal and if the beacon is less than a threshold value, the wireless power transmission system will not send wireless power over that path.

Although the three paths shown in the example of FIGS. 5A and 5B are illustrated for simplicity, it is appreciated that any number of paths can be utilized for transmitting power to the wireless device 502 depending on, among other factors, reflective and absorptive objects in the wireless power delivery environment.

II. Load Balancing and Client Handoff

Techniques are described herein for load balancing wireless power receiver clients over multiple wireless power transmission systems in a wireless power delivery environment. In some embodiments, a method is described. The method includes identifying transmitter load information associated with at least two wireless power transmission systems of the multiple wireless power transmission systems, detecting a load imbalance between the at least two wireless power transmission systems based, at least in part, on the transmitter load information, and determining one or more operations for improving the load imbalance. The method further includes directing one or more of the at least two wireless power transmission systems to perform the one or more operations.

Figure 6:
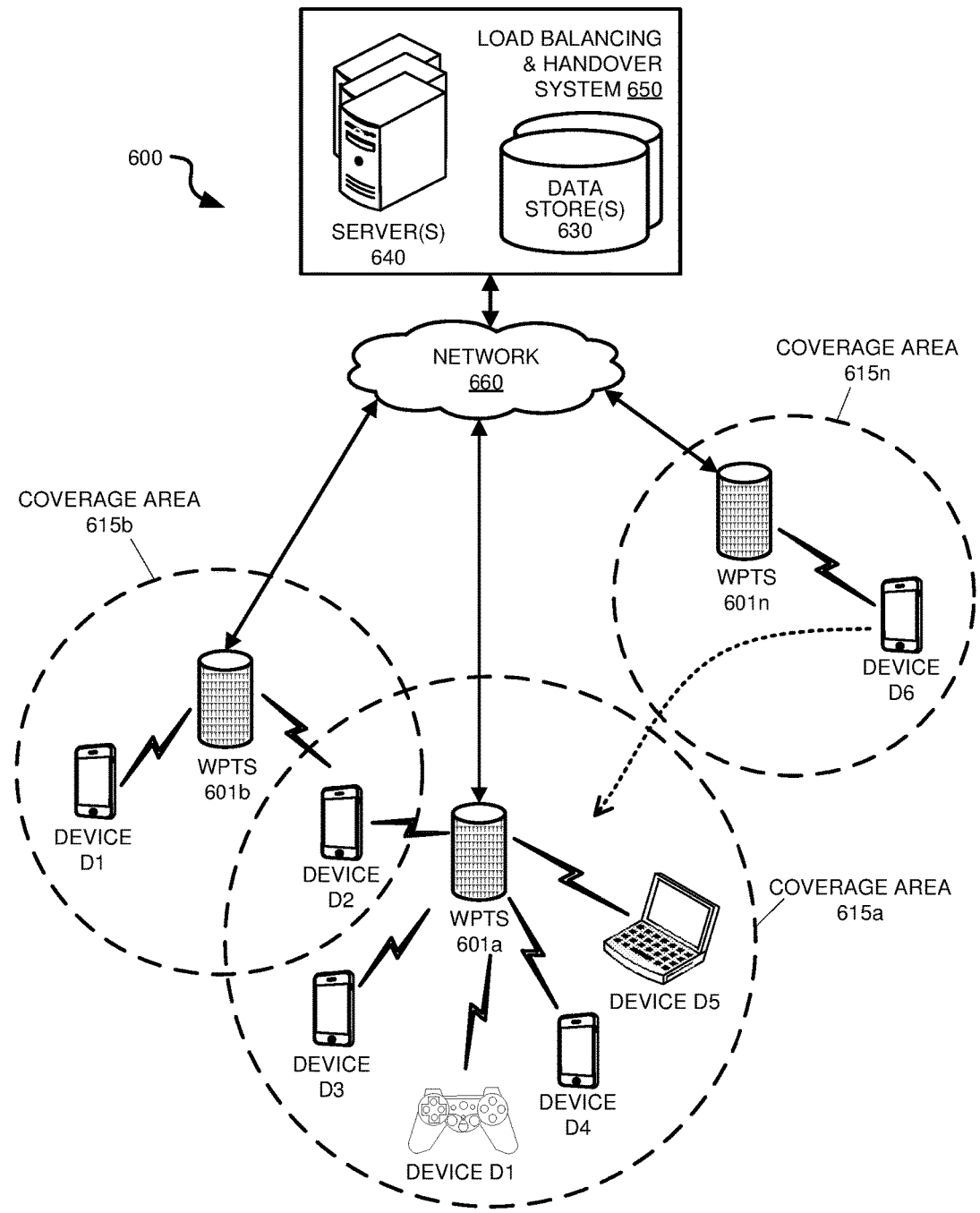
FIG. 6 depicts a diagram illustrating an example wireless power delivery environment in accordance with some embodiments.

FIG. 6 depicts a diagram illustrating an example wireless power delivery environment 600, according to some embodiments. The example wireless power delivery environment 600 includes wireless power transmission systems 601a-601n, devices D1-D6, a load balancing and handover system 650, and a network 660. The wireless power transmission system 601 can be wireless power transmission system 101 of FIG. 1 or wireless power transmission system 300 of FIG. 3, although alternative configurations are possible. As discussed herein, each of the devices D1-D6 can be, for example, a wireless device 102 of FIG. 1 including one or more wireless power receiver clients. Each wireless power receiver client can be a wireless power receiver client 103 of FIG. 1 or a wireless power receiver client 400 of FIG. 4, although alternative configurations are possible. Devices D1-D6 are shown in environment 600; more or fewer devices are possible.

The wireless power transmission systems 601a-601n can provide wireless power to devices that are located within respective wireless power transmission coverage area 615a-615n. As shown in the example of FIG. 6, the wireless power transmission systems 601a and 601b have overlapping coverage areas 615a and 615b, respectively. Device D2 is shown as residing within the overlapping coverage area and, thus, can receive wireless power (or energy) from either wireless power transmission system 601a or wireless power transmission system 601b.

Initial charger selection may occur as discussed herein, however, as additional devices enter the charging environment, as signals degrade, or as the devices move from one location to another, the wireless power transmission systems 601a-601n may perform the load balancing techniques discussed herein. For example, the wireless power transmission systems 601a-601n can monitor and/or otherwise determine their corresponding transmission loads. The transmission loads can be indicative of, for example, the number of devices being serviced by a particular wireless power transmission system, the energy requirements of the devices being serviced, the charging efficiency of the devices being serviced, the priorities of the devices being serviced, etc.

In some embodiments, the wireless power transmission systems 601a-601n provide wireless power transmission load information to the load balancing and handover system 650 or another wireless power transmission system (either via direct communication or via the network 660). The transmission load information can be provided periodically, responsive to updates or changes in the information, responsive to requests for the information from the load balancing and handover system 650 or another wireless power transmission system, or in a variety of other manners including combinations or variations thereof.

Once the load information is obtained for wireless power transmission systems with overlapping coverage areas, a load balancing procedure can be performed. As devices enter and leave a charging environment, as signals degrade, or as the devices move from one transmission area to another, it may be advantageous to perform load balancing. An example load balancing procedure is shown and discussed in greater detail with reference to FIG. 8. As discussed above, the load balancing and handover system 650 can, among other features, monitor transmitter load information associated with the wireless power transmission systems 601a-601n and perform the load balancing techniques or functions discussed herein. Although shown as a separate entity in the example of FIG. 6, it is appreciated that some or all of the functionality of the load balancing and handover system 650 can, alternatively or additionally, be provided, in whole or in part, by one or more of the wireless power transmission systems 601a-601n.

As shown in the example of FIG. 6, the load balancing and handover system 650 includes multiple servers 640 and data repositories 630. Any number of servers 640 and/or data repositories 630 may be included in processing system 650. The load balancing and handover system 650 can be a cloud-based or central processing system; however, it is appreciated that in some embodiments, the load balancing and handover system 650 can be a local processing system, e.g., co-located with or near the wireless power transmission system(s) in the wireless power delivery environment or coverage area 615 or built into and/or otherwise combined with a wireless power transmission system.

The network 660 can be any collection of distinct networks operating wholly or partially in conjunction to provide connectivity and may appear as one or more networks to the serviced systems and devices. For example, network 660 can be an open network, such as the Internet, a private network, such as an intranet and/or the extranet, and/or combinations or variations thereof. The device, wireless power transmission system and the registration system may each access network 660 by different access networks (not shown) which are shown included within network 660.

Figure 7:
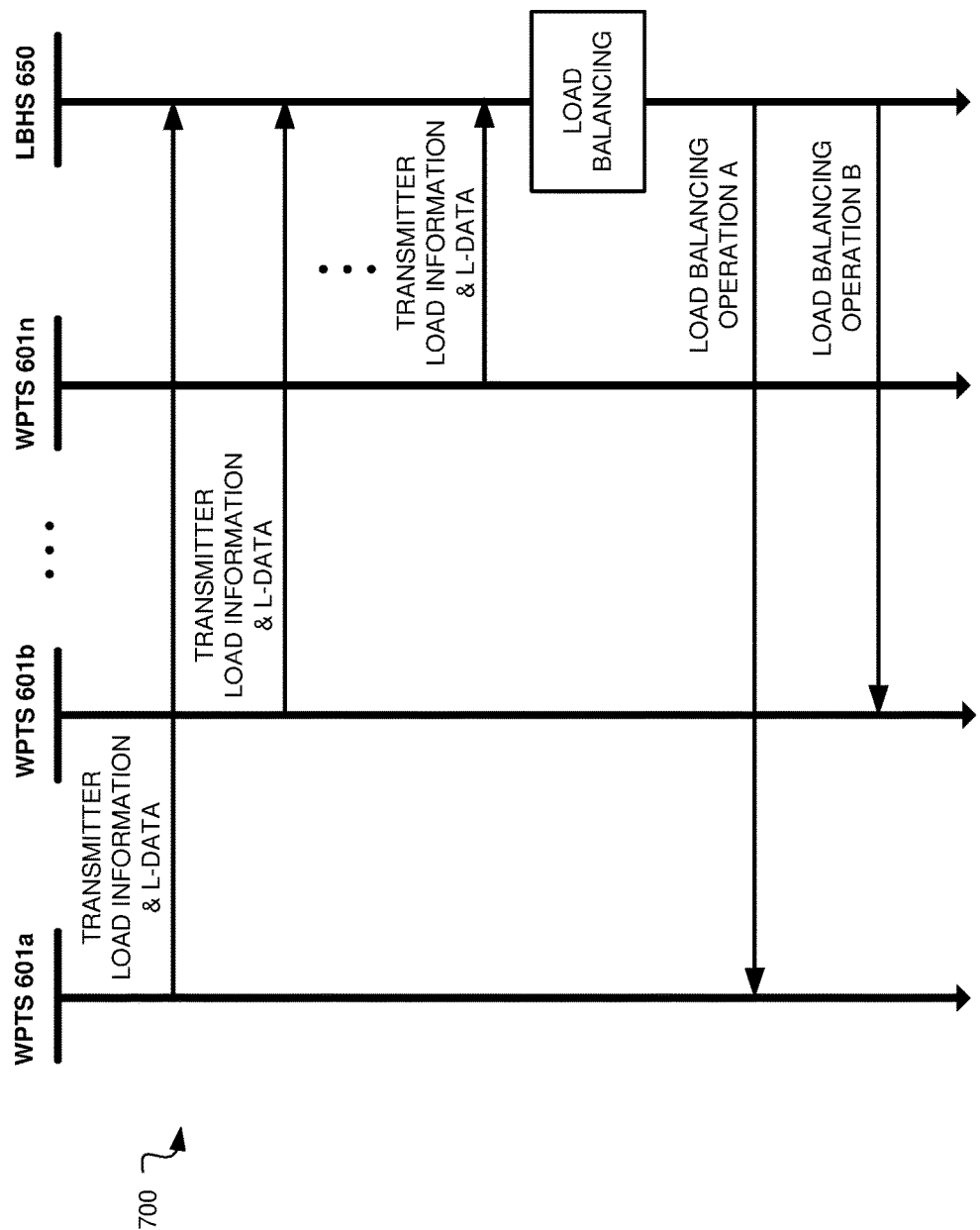
FIG. 7 depicts a sequence diagram illustrating example signaling between various components of the example wireless power delivery environment for performing a load balancing technique among wireless power transmission systems in accordance with some embodiments.

To further illustrate the operation of the various components of example system 600, FIG. 7 is provided. FIG. 7 depicts a sequence diagram 700 illustrating example signaling between various components of the example wireless power delivery environment 600 for performing a load balancing technique among wireless power transmission systems 601a-601n, according to some embodiments. As shown, the example load balancing technique or process is performed by the load balancing and handover system 650; however, as discussed herein, the example load balancing process can alternatively or additionally be performed, in whole or in part, by one or more individual wireless power transmission systems of the wireless power delivery environment.

Continuing with the example of FIG. 7, initially, communications are established between the devices D1-D6 and corresponding wireless power transmission systems 601a-601n for initiating wireless power delivery to the wireless power receiver clients associated with the devices D1-D6. Among other functions, the wireless power transmission systems 601a-601n monitor or measure corresponding transmitter loads of the wireless power transmission systems. As discussed herein, the transmitter loads or load levels can be indicative of one or more of the number of devices being serviced by a particular wireless power transmission system, the energy requirements of the devices being serviced, the charging efficiency of the devices being services, the priorities of the devices being serviced, etc.

The wireless power transmission systems 601a-601n provide their transmitter load information to the load balancing and handover system 650. In some embodiments, the wireless power transmission systems 601a-601n transfer transmitter load information periodically, when the information changes, or upon request from the load balancing and handover system 650 or, in some embodiments, another wireless power transmission system.

The wireless power transmission systems 601a-601n can also provide information concerning the wireless power transmission system's local area environment or locale. This locale information (or L-data) may be predetermined and stored in the transmitter or may be acquired automatically by the transmitter, from time to time, by receiving updates from a controller or by scanning the environment to detect the presence of other wireless power transmission systems. This data may be persistent or slow changing so that, for example, temporary changes in the environment do not cause inaccurate locale information to be stored. Thus, even if a transmitter has been discovered and then disappears due to a temporary signal loss, its known prior existence may be of value to a nearby receiving appliance. Uncertainty in the availability of that transmitter may, however, be reported as part of the locale information set. When a transmitter is fully loaded with other clients, this status may also be reported as locale information.

The load balancing and handover system 650 receives and processes the transmitter load information and performs a load balancing procedure based on received information. An example load balancing procedure is shown and discussed in greater detail with reference to FIG. 8. As part of the load balancing procedure, if the load balancing and handover system 650 detects a load imbalance between at least two wireless power transmission systems, then the system can identify and/or otherwise determine one or more operations for improving the load imbalance. For example, the operations can direct one or more wireless power transmission systems to handover one or more wireless power receiver clients to another adjacent wireless power transmission system. In some embodiments, the handover can be coordinated or uncoordinated. For example, a coordinated handoff can include a wireless power transmission system passing information regarding a client to another wireless power transmission system. Conversely, the handoff can be uncoordinated in that the operation directs a wireless power transmission system to cease serving the client realizing that the client is within range and will seek a connection with another wireless power transmission system. Likewise, an operation can direct an over-utilized wireless power transmission system to simply discontinue accepting connection requests from wireless power receiver clients.

In one example of operation, wireless power transmission system 601a is determined to be over over-utilized when device D6 attempts to establish a connection. The wireless power transmission system 601a identifies and/or otherwise determines its transmission load information and sends the information to the load balancing and handover system 650. The load balancing and handover system 650 determines that wireless power transmission system 601b is proximate to wireless power transmission system 601a and identifies device D2 as existing in an overlapping coverage area of 615a and 615b. Accordingly, in this example, the load balancing and handover system 650 directs the wireless power transmission system 601a to handoff device D2 to power transmission system 601b in order to reduce the transmission load on wireless power transmission system 601a. Alternatively, the load balancing and handover system 650 could direct the wireless power transmission system 601a to simply stop accepting requests for wireless power from new devices or identify a lower priority device and, at least temporarily, stop providing that low priority device with wireless power.

Figure 8:
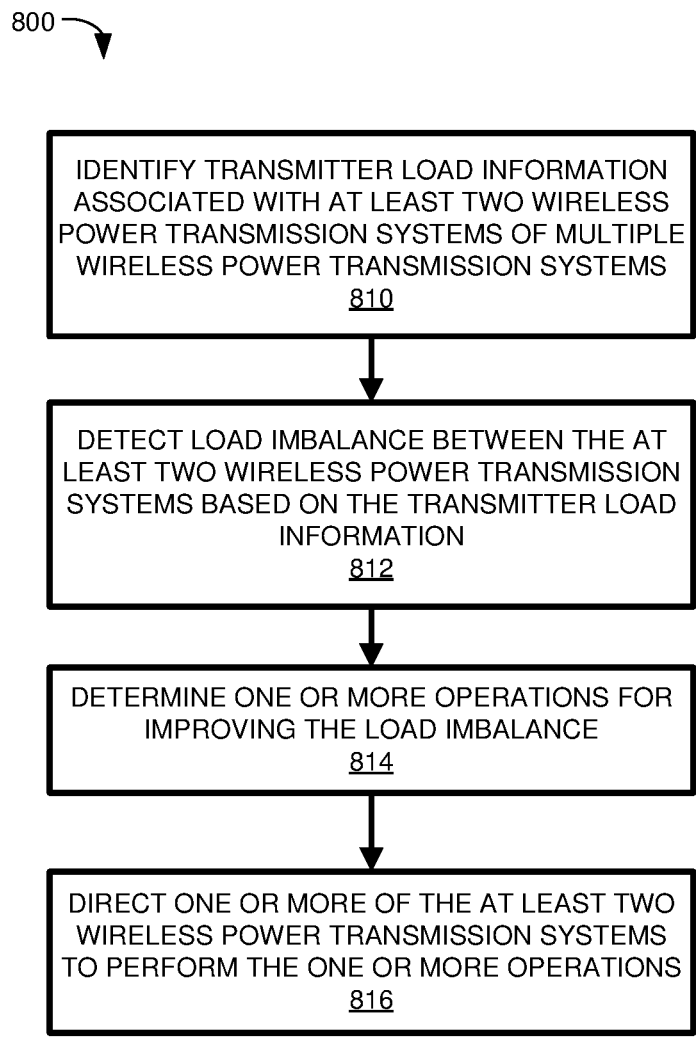
FIG. 8 depicts a flow diagram illustrating an example load balancing process in accordance with some embodiments.

FIG. 8 depicts a flow diagram illustrating an example load balancing process 800, according to some embodiments. More specifically, the load balancing process 800 illustrates an example load balancing procedure whereby wireless power receiver clients are load balanced over multiple wireless power transmission systems in a wireless power delivery environment. A load balancing and handover system such as, for example, load balancing and handover system 650 of FIG. 6 can, among other functions, perform the example load balancing process 800. In some embodiments, the example load balancing process 800 can alternatively be performed, in whole or in part, by a wireless power transmission system such as, for example, wireless power transmission system 601 of FIG. 6.

To begin, at 810, the load balancing and handover system identifies transmitter load information associated with at least two wireless power transmission systems of the multiple wireless power transmission systems. As discussed above, in some embodiments, the load balancing and handover system can receive L-data concerning the local area environment of the wireless power transmission systems. Alternatively, or additionally, load information can include information, including location information, about particular wireless power receiver clients.

At process 812, the load balancing and handover system detects a load imbalance between the at least two wireless power transmission systems based, at least in part, on the transmitter load information. An example of process of detecting a load imbalance between at least two wireless power transmission systems is shown and discussed in greater detail with reference to FIG. 9.

At process 814, the load balancing and handover system determines one or more operations for improving the load imbalance. For example, the operations can direct one or more wireless power transmission systems to handover one or more wireless power receiver clients. In some embodiments, the handover can be coordinated or uncoordinated. For example, a coordinated handoff can include a wireless power transmission system passing information regarding a client to another wireless power transmission system. Conversely, the handoff can be uncoordinated in that the operation directs a wireless power transmission system to cease serving the client (providing wireless power to the client) knowing that the client is within range of another wireless power transmission system that can service the client. Likewise, an operation can direct an over-utilized wireless power transmission system to discontinue accepting requests for request from wireless power from wireless power receiver clients.

Lastly, at process 816, the load balancing and handover system directs one or more of the at least two wireless power transmission systems to perform the one or more operations.

Figure 9:
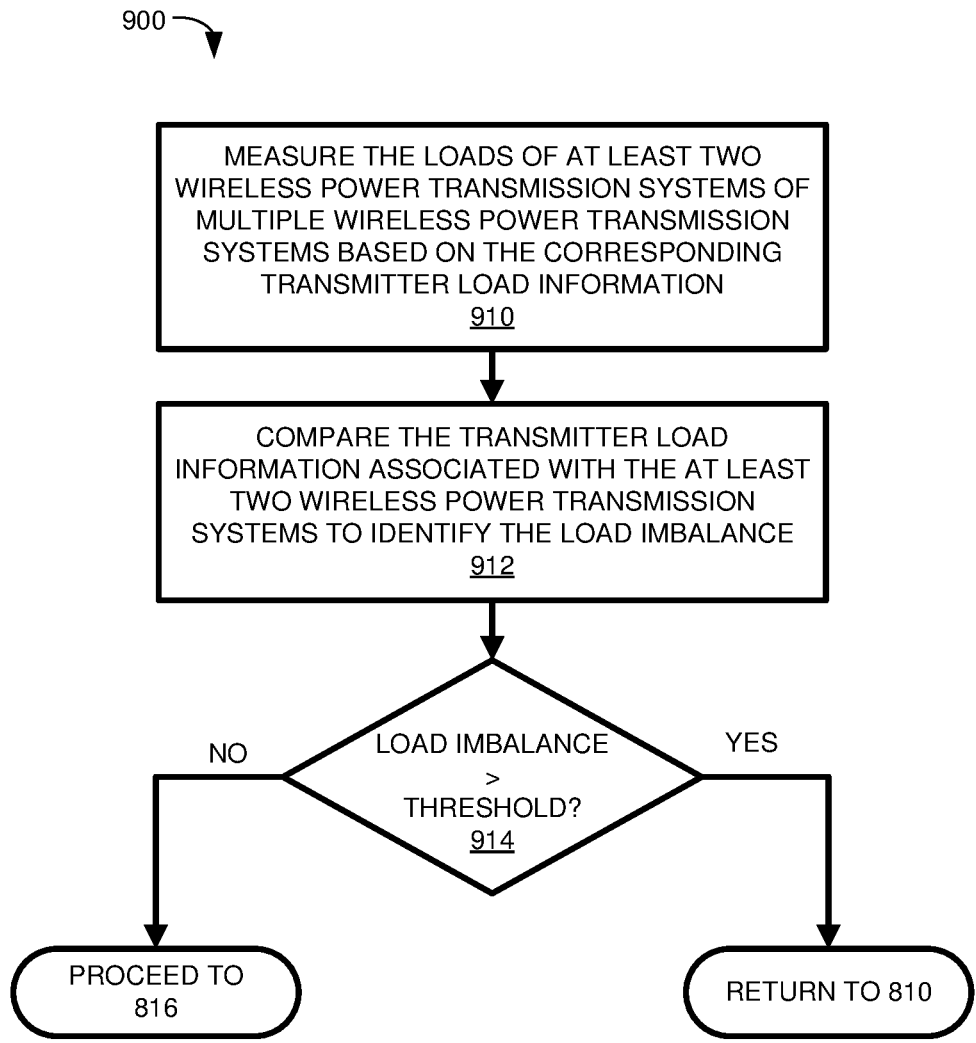
FIG. 9 depicts a flow diagram illustrating an example load detection process of detecting a load imbalance between at least two wireless power transmission systems based on transmitter load information corresponding to the wireless power transmission systems in accordance with some embodiments.

FIG. 9 depicts a flow diagram illustrating an example load detection process 900 of detecting a load imbalance between at least two wireless power transmission systems based on transmitter load information corresponding to the wireless power transmission systems. A load balancing and handover system such as, for example, load balancing and handover system 650 of FIG. 6 can, among other functions, perform the example load detection process 900. In some embodiments, the example load detection process 900 can alternatively be performed, in whole or in part, by a wireless power transmission system such as, for example, wireless power transmission system 601 of FIG. 6.

To begin, at 910, the load balancing and handover system measures the loads of at least two wireless power transmission systems of the multiple wireless power transmission systems based on the corresponding transmitter load information. Measuring the loads can include quantifying one or more elements of received load information. For example, measuring the loads can include determining a number of devices being serviced by each of the at least two wireless power transmission systems. Similarly, measuring the load can include quantifying other element of the received load information. For example, the load balancing and handover system can, among other funcions, quantify the energy requirements of devices being serviced by each of the at least two wireless power transmission systems, the charging efficiency of one or more of the at least two wireless power transmission systems, or the device priority or location of one or more of the devices being serviced by the wireless power transmission systems.

At 912, the load balancing and handover system compares the transmitter load information associated with the at least two wireless power transmission systems to identify the load imbalance. Lastly, at decision 914, the load balancing and handover system determines if the load imbalance exceeds a balance threshold. If so, the process returns to 810 of FIG. 8. Otherwise, the process proceeds to 816 of FIG. 8.

Figure 10:
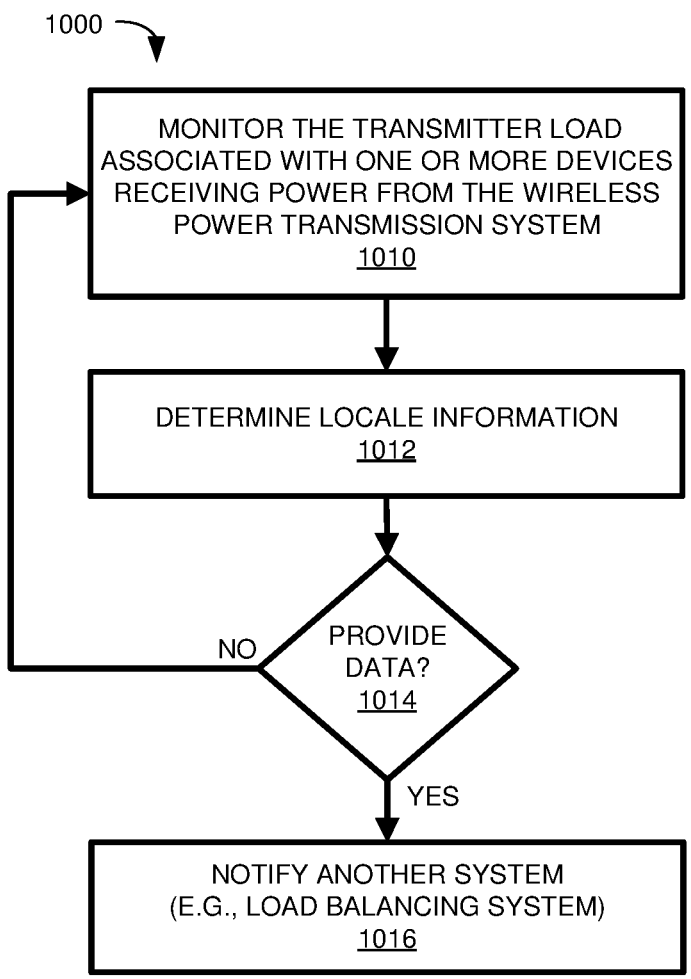
FIG. 10 depicts a flow diagram illustrating an example load monitoring process in accordance with some embodiments.

FIG. 10 depicts a flow diagram illustrating an example load monitoring process 1000, according to some embodiments. A wireless power transmission system such as, for example, wireless power transmission system 601 of FIG. 6 can, among other functions, perform the example load monitoring process 1000.

To begin, at 1010 the wireless power transmission system monitors the transmission load associated with one or more devices receiving power from the wireless power transmission system. At process 1012, the wireless power transmission system determines locale information. As discussed herein, the locale information is information concerning the wireless power transmission system's local area environment or locale. The locale information may be predetermined and stored in the transmitter or may be acquired automatically by the transmitter, from time to time, by receiving updates from a controller or by scanning the environment to detect the presence of other transmitters of the same kind. This data may be persistent or slow changing so that temporary changes in the environment do not cause wildly inaccurate locale information to be stored. Even if a transmitter has been discovered and then disappears due to a temporary signal loss, its known prior existence may be of value to a nearby receiving appliance. Uncertainty in the availability of that transmitter may, however, be reported as part of the locale information set. When a transmitter is fully loaded with other clients, this status may also be reported as locale information.

Next, at decision process 1014, the wireless power transmission system determines if it should provide the locale information and/or the transmission load information to another wireless power transmission system or a load balancing and handover system such as, for example, load balancing and handover system 650 of FIG. 6. For example, the wireless power transmission system may need to provide the locale information to another wireless power transmission system or a load balancing and handover system. As discussed above, the locale information may be provided periodically, responsive to a change in the environment, responsive to a request for locale information, or in other manners.

Lastly, at 1016, the wireless power transmission system provides the information if it is determined that the information needs to be shared with another system.

III. Additional Rebalancing Embodiments (Receiver Iintiated)

There may be circumstances where it is advantageous to reevaluate the connection between a wireless power receiver client and the wireless power transmission systems that are available to the receiver. For example, if at some point, a wireless power receiver discovers that a particular wireless power transmission system is providing less than a predetermined threshold power level, then it may begin to search for an improved service level. In a similar vein, as discussed above, if a wireless power transmission system or a load balancing and handover system discovers that a wireless power receiver is receiving less than its desired charge rate, then it may instruct the wireless power receiver to seek an alternate service. The discovery process can be triggered, for example, as a result of a routine time-based response to a broadcast or a specific wireless power receiver inquiry, e.g., request for power or to join network.

The wireless power receiver then attempts to discover a wireless power transmission system transmitter signal that is operating at or above a predetermined signal level since this is usually indicative that a charging signal will be able to produce a required charge rate. As a general rule the wireless power receiver will try to find the strongest transmitter signal and then try to determine if there is any capacity available. If a wireless power transmission system is already fully loaded, then it may not be able to respond to a request for service. In this case the receiver may try another transmitter that has a lesser signal and so on until either service is provided or until there is no satisfactory result. In this latter case, the receiver will wait for a time, which may be predetermined or based on some random event, before it tries to locate service once again. This sequencing of attempts to connect is similar to carrier sense systems which suffer from collision problems when there are more than a small number of remote clients seeking to gain service and a somewhat more sophisticated system is generally to be preferred.

If a wireless power receiver client is receiving sufficient charge, there may be no motivation to seek an alternate connection, but if a wireless power transmission system is requested to provide service to a higher priority client, then it may instruct the wireless power receiver to disconnect from its present connection and either wait, or else seek a neighboring transmitter. In some cases, it may be possible for a wireless power transmission system to provide handover information to a receiver.

Figure 11A:
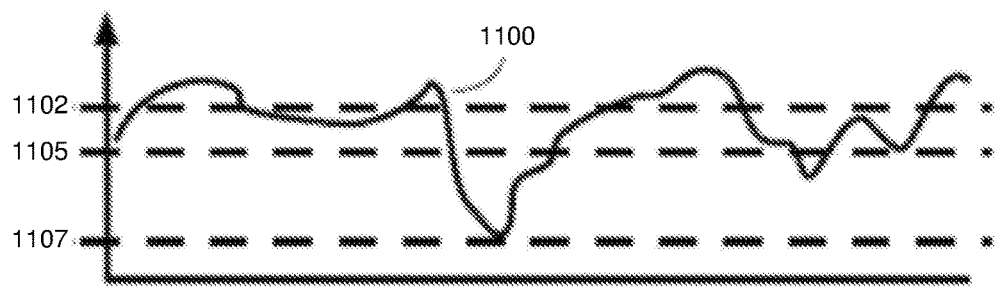
FIGS. 11A and 11B illustrate an example signal strength graph for an appliance for any given location local to the wireless power transmission system in accordance with some embodiments.
Figure 11B:
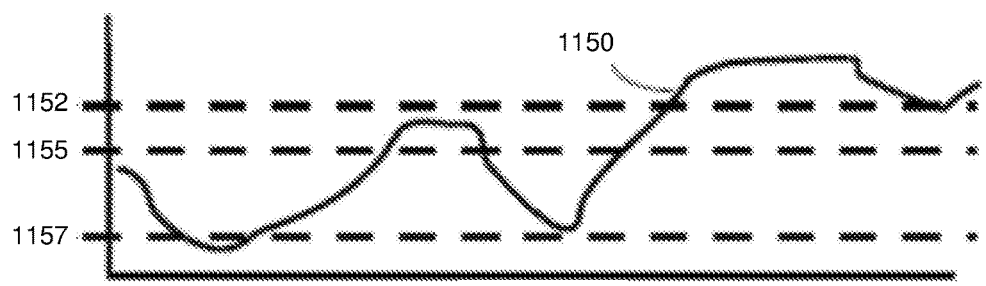

FIGS. 11A and 11B illustrate an example signal strength graph for an appliance, e.g., wireless power receiver client, for any given location local to the wireless power transmission system. The vertical axis represents signal strength and the horizontal axis represents time. Graph 1100 shows an example of a time varying signal in a typical environment. Three example thresholds are also shown. The upper threshold, 1102, may be a level that the signal needs to exceed for at least some percentage of the time for the appliance to stay connected to the transmitter. For example, if the appliance sees that the signal is above this threshold for more than a quarter of the time then this may lead to a sufficient charge rate; it should be clear that this target threshold may be varied heuristically.

The second threshold, 1105, may be set at a level that is a preferred working level at which the appliance needs to accumulate charge. By way of example, an appliance may require the signals to be above this threshold for a certain percentage of the time it is connected. The lowest threshold, 1107, may be set to a level that defines an unacceptable level of service; if the signal level drops to this threshold then some action may be initiated to attempt to retrieve a signal that allows a better rate of charge accumulation. An example of an attempt to secure better service might be for the client appliance to switch to a different physical antenna with a different orientation. This represents a diversity solution and relies on the fact that fading the loss of signal level as a result of multipath propagation effects is not correlated between different polarizations. It should be equally clear that the measurement of performance may be averaged, or integrated over a period of time or may be treated as an instantaneous value. This then illustrates the use of received signal strength as a management strategy to determine what actions may be taken by the appliance to optimize the accumulation of charge.

Graph 1150 of FIG. 11B shows a different signal level with respect to time and illustrates with the same threshold levels, 1152, 1155 and 1157 how a second appliance may perceive signal strength. In this latter case, the signal is persistently below the middle threshold and at one point below the lowest threshold. From this it may be deduced that the signal is only marginally useful. It is also true that at least at one point in time the signal level exceeds the threshold that might cause it to attempt to remain connected. How the appliance responds may take all of this information under consideration.

When a signal reaches the point where it no longer provides a net positive charge to the appliance, a system where a single wireless power transmission system is deployed for the appliance has a significant limitation. Assuming that the option to select a better performing combination of antennas is exhausted, one possibility may be to alter the frequency of the power transmission. As a rule, the category of antennas used for this application are inherently quite broadband, and do not exhibit particularly high Q so a 5-10% bandwidth is quite realistic in practice. This means that allowing the transmitter to shift in frequency is a suitable solution. A small percentage shift will significantly alter the standing wave pattern and this will allow a receiver to be lifted from a signal null, thus markedly improving the performance of the system.

Although signal strength is a useful parameter since it can be calibrated to reflect what kind of charge transfer is to be anticipated, the actual charge transfer is something that may be measured. The connection between the radio frequency component that converts the signal into a direct current charging source and the appliance is a point at which the current can be measured. If the current in Amperes is integrated over time, the result will be the net charge delivered in coulombs. This coulomb counting is a preferred way to care for advanced batteries; a more common measure would be to use much smaller units and milli-coulombs or even micro coulombs is more common with small appliances. We are mostly concerned with the available power from a radio carrier, so using coulomb counting in conjunction with the signal strength information allows us to make rational decisions about the utility of any power connection that we may be able to establish through the receiver.

Referring back to FIG. 6, consider device D2 which can receive power from either wireless power transmission system 601*a* or wireless power transmission system 601*b* as the device resided within coverage area 1410*a* and 1410*b*, respectively, overlaps and devices 1412*b-d* exist within coverage areas 615*a* and 615*b*. In a generalized multipath environment, a receiver will receive signals from one transmitter at a higher level than the other. Even though it is possible that both will be received equally well (or in some cases equally badly) this is an exceptional case. In this example, the device D2 may be closer to one wireless power transmission system than the other meaning that at least the direct path will be stronger in proportion to the ratios of the inverse squares of the distances. Assume now that for some reason, the path between device D2 and the closer wireless power transmission system becomes obscured such that the signal level diminished significantly. The task facing the wireless power receiver of device D2 is to find a signal that replaces the lost signal so that it may continue to charge. If device D2 has prior knowledge of the existence of another wireless power transmission system within range, then it may attempt to connect to that wireless power transmission system and continue charging, albeit at the rate determined by the strength of the signal which since the receiver is further away may be expected to be somewhat less than the original wireless power transmission system.

Figure 12:
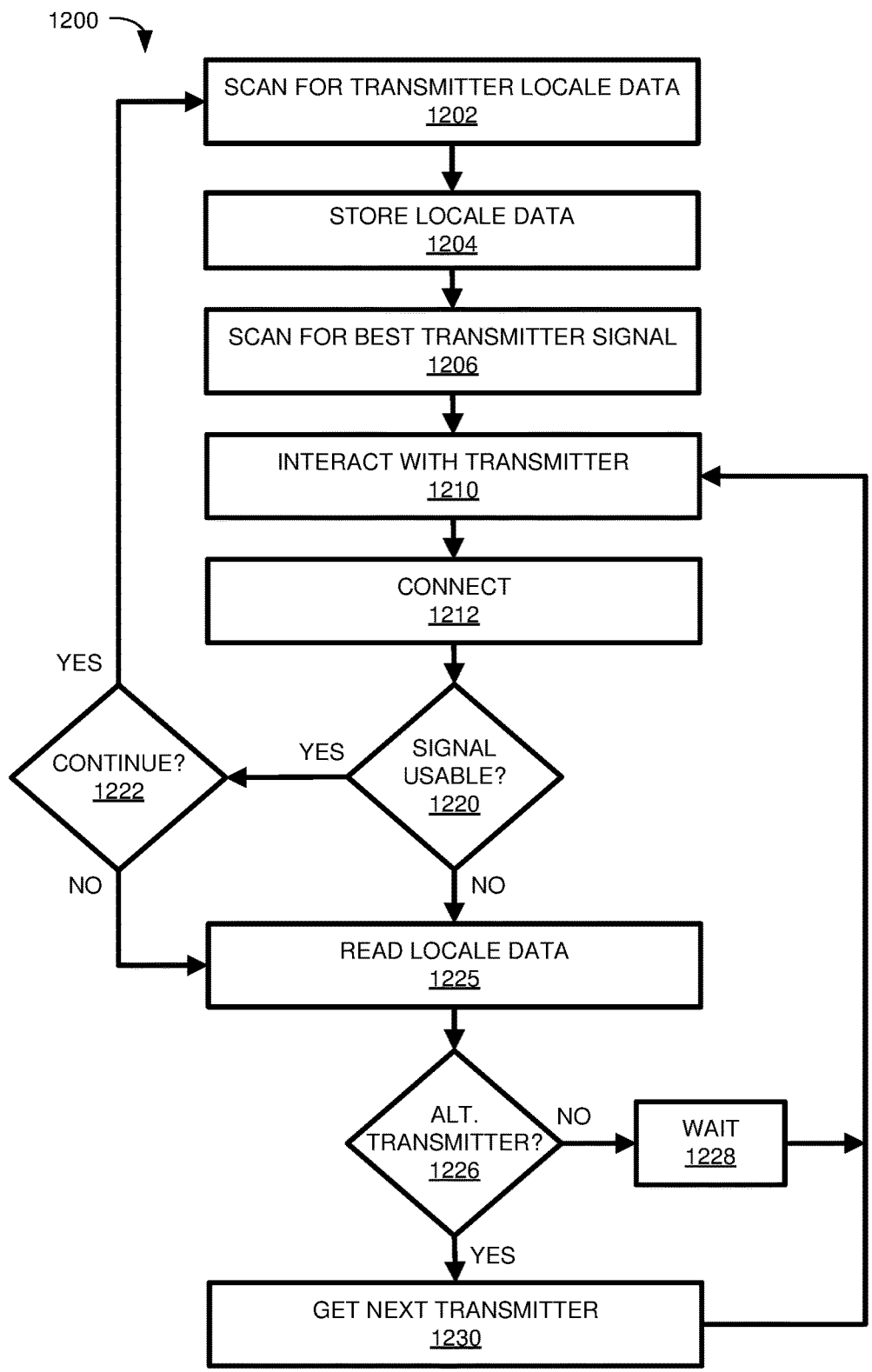
FIG. 12 is an example process of determining which wireless power transmission system to connect to in accordance with some embodiments.

An example process of determining which wireless power transmission system to connect to is described in process 1200 of FIG. 12. In addition to transmissions that are intended to supply power, each wireless power transmission system may also encode information within any part of the transmissions. For the purposes of this example, the wireless power transmission system can broadcast a data set that is concerned with its local area environment or locale. This locale information (or L-data) may be predetermined and stored in the wireless power transmission system or may be acquired automatically by the transmitter, from time to time, by receiving updates from a controller or by scanning the environment to detect the presence of other transmitters of the same kind. This data may be persistent or slow changing so that temporary changes in the environment do not cause wildly inaccurate locale information to be stored. Even if a wireless power transmission system has been discovered, and then disappears due to a temporary signal loss, its known existence may be of value to a nearby receiving appliance. Uncertainty in the availability of that transmitter may, however, be reported as part of the locale information set. When a wireless power transmission system is fully loaded with other clients, this status may also be reported as locale information.

A single wireless power transmission system installation may simply include itself in the locale information broadcast. A wireless power transmission system may be assigned an ID if necessary but there is no requirement that this be in any way unique. For example, IDs may be assigned by a connected controller (whether the connection is a physical or wireless connection is not material), they may be assigned by a time based algorithm that may select the next available ID or the ID may be set by hardware such as switches and their positions.

To begin, the wireless power receiver must first look for an available wireless power transmission system, at 1202. At this point, any wireless power transmission system which is broadcasting a locale information stream or beacon may be used as a starting point. As part of its routine housekeeping, the receiver (i.e., wireless power receiver client) will from time to time look for other wireless power transmission systems and their locale information. Received locale information may be stored, at 1204, by the receiver in any convenient fashion and, based on stored locale information the receiver will attempt to discover an available wireless power transmission system with the highest signal level, at 1206. Any locale information related to this wireless power transmission system may then be stored as the current wireless power transmission system. Once the "loudest" wireless power transmission system has been located, the receiver will then attempt to interact with this wireless power transmission system, at 1210, and if successful will then connect, at 1212.

Once a connection has been established, the receiver may then maintain a watch upon the usability of the received charging power, at 1220, and if satisfactory, will simply continue, at 1622, to draw power. If, however, the supplied power is inadequate to maintain some pre-determined charge rate, then the receiver may attempt some other connection if this is available. The locale information may be read from memory and the next most likely wireless power transmission system may be sought, at 1230. If this wireless power transmission system is then able to deliver a better power connection, then the receiver will move to this new connection. In some embodiments, in order to determine if the new wireless power transmission system will be capable of delivering superior service, the client must initially drop the existing charger connection, and then join the new charger's network. The new charger will then schedule power delivery to this newly added client. Once power is delivered, the client may measure the power received and thereby determine if the new charger is sufficiently improved over the prior charger network to warrant remaining on the new charger. In alternate embodiments, each charger may receive feedback from all clients being supplied power and utilize this information to gauge how efficiently power is generally being transmitted to clients. This information may then be imbedded within the charger's broadcasts, thereby providing at least a basic indication of what sort of performance may be expected when joining the given charger's network.

This sequence of actions may be repeated by the receiver at any time, but in one implementation the receiver is not permitted to change too frequently since it is possible to make the system unstable as the client appliances begin to play "musical chairs" seizing recently abandoned wireless power transmission systems and making them unavailable for a receiver to return to if the attempted new connection is not successful or does not perform well enough.

In another implementation, a receiver may be displaced by a wireless power transmission system that is reassigning its service priorities, for example to deal with a new high priority client. In this case, the locale information broadcast may indicate that the wireless power transmission system is no longer available to new clients and any or all presently connected appliances may be displaced. To ensure that connection attempts are made to any other available wireless power transmission systems, receiving appliances may use a random time delay before attempting a new connection. If the locale information records indicate that only one wireless power transmission system is available, then receiving appliances will be required to wait for capacity to become available.

In some embodiments, the effect of a change in the circumstances of the wireless power transmission system from the point of view of a currently connected receiver, for example the arrival of a higher priority receiver. Regardless of the status of a wireless power transmission system, some receivers which have a designated high priority, such as an appliance that is very low on charge and will not be able to function for much longer, may apply for a power connection as a matter of urgency. When this happens, the wireless power transmission system may, if busy, terminate service to a lower priority user so that the high priority receiver can be serviced. Now if a usable signal is available, instead of continuing, at 1622, if the receiver becomes aware that it may no longer be able to continue, then it reads the locale information to discover if it has a pre-determined wireless power transmission system that it may be able to connect to in order to restore charging service at 1225.

If there is only one entry in the locale information record, at 1226, then it may be limited to attempting to reconnect with the wireless power transmission system that has just dismissed it from charging service. To ensure that repeated and fruitless connection attempts do not overload the capacity of the channel, a wait condition, at 1228, is imposed to prevent this. After the waiting period has elapsed, the receiver may then attempt to interact with the wireless power transmission system, returning to 1210.

In one implementation, the power receiver may be in motion. In this example, the user is moving at a pedestrian pace down a platform at a train station. As the receiver moves further from the wireless power transmission system, the average charge rate is expected to drop; instantaneous values may peak due to multipath interference effects in a way that is similar to the picket fence effect experienced by listeners to FM stations. If the system of transmitters is preplanned and installed for continuous coverage, the transmitter information broadcast may be used to direct the power receiver to make the connection to a different wireless power transmission system. However, if the area is crowded, there may be insufficient service available from any particular wireless power transmission system and so the power receiver should operate politely, avoiding undue persistence of requests as explained in FIG. 12, and make requests of any wireless power transmission systems that may be available. In the case where wireless power transmission systems operate independently; they may still be able to assemble a locale-aware list of known wireless power transmission systems so that the receivers will have access to a meaningful locale-data list. In this way the power receiver may be able to smoothly transition between service point wireless power transmission systems to maintain an acceptable charge rate.

Figure 13:
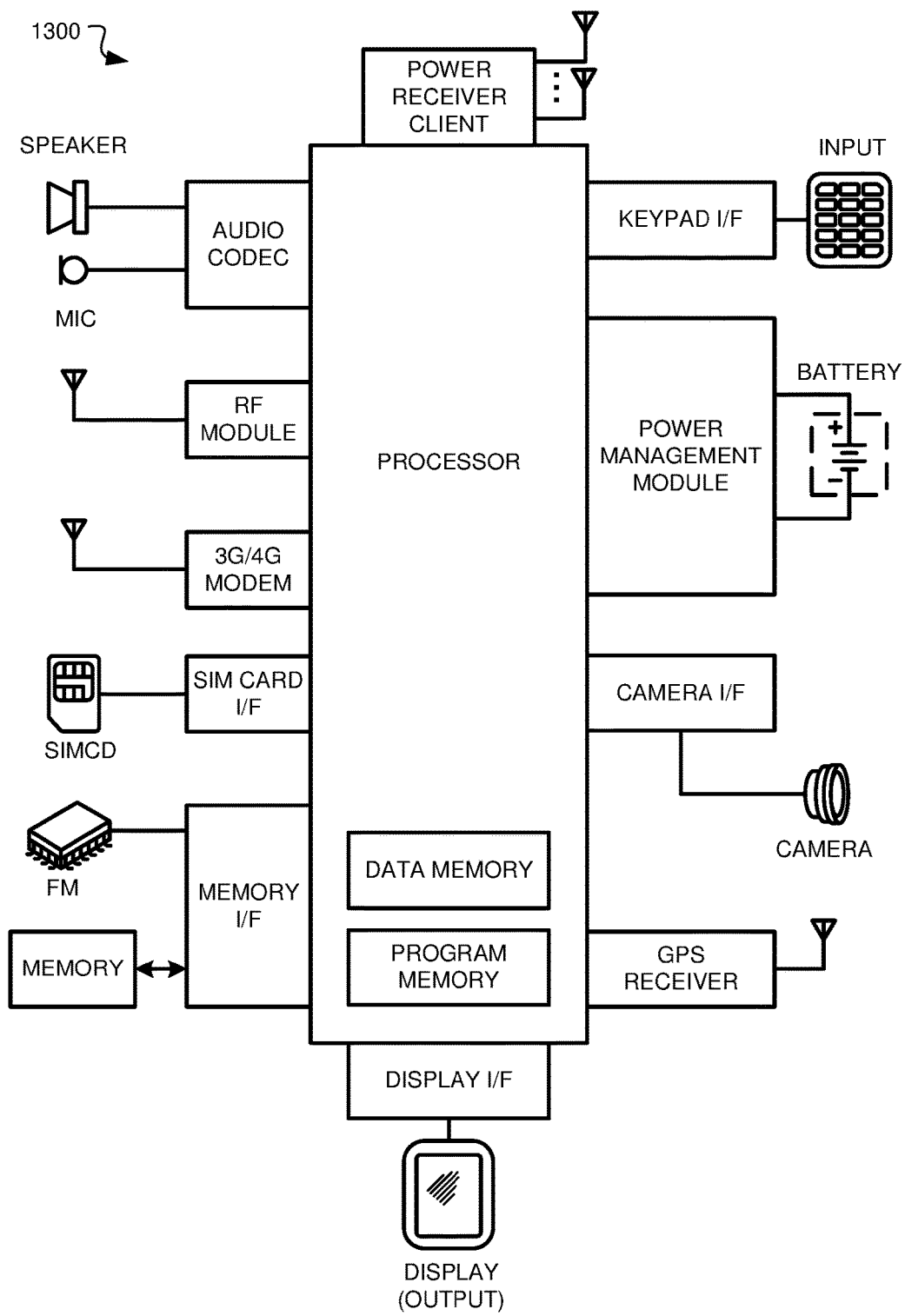
FIG. 13 depicts a block diagram illustrating example components of a representative mobile device or tablet computer with one or more wireless power receiver clients in the form of a mobile (or smart) phone or tablet computer device in accordance with some embodiments.

FIG. 13 depicts a block diagram illustrating example components of a representative mobile device or tablet computer 1300 with a wireless power receiver or client in the form of a mobile (or smart) phone or tablet computer device, according to an embodiment. Various interfaces and modules are shown with reference to FIG. 13, however, the mobile device or tablet computer does not require all of modules or functions for performing the functionality described herein. It is appreciated that, in many embodiments, various components are not included and/or necessary for operation of the category controller. For example, components such as GPS radios, cellular radios, and accelerometers may not be included in the controllers to reduce costs and/or complexity. Additionally, components such as ZigBee radios and RFID transceivers, along with antennas, can populate the Printed Circuit Board.

The wireless power receiver client can be a power receiver client 103 of FIG. 1, although alternative configurations are possible. Additionally, the wireless power receiver client can include one or more RF antennas for reception of power and/or data signals from a power transmission system, e.g., wireless power transmission system 101 of FIG. 1.

Figure 14:
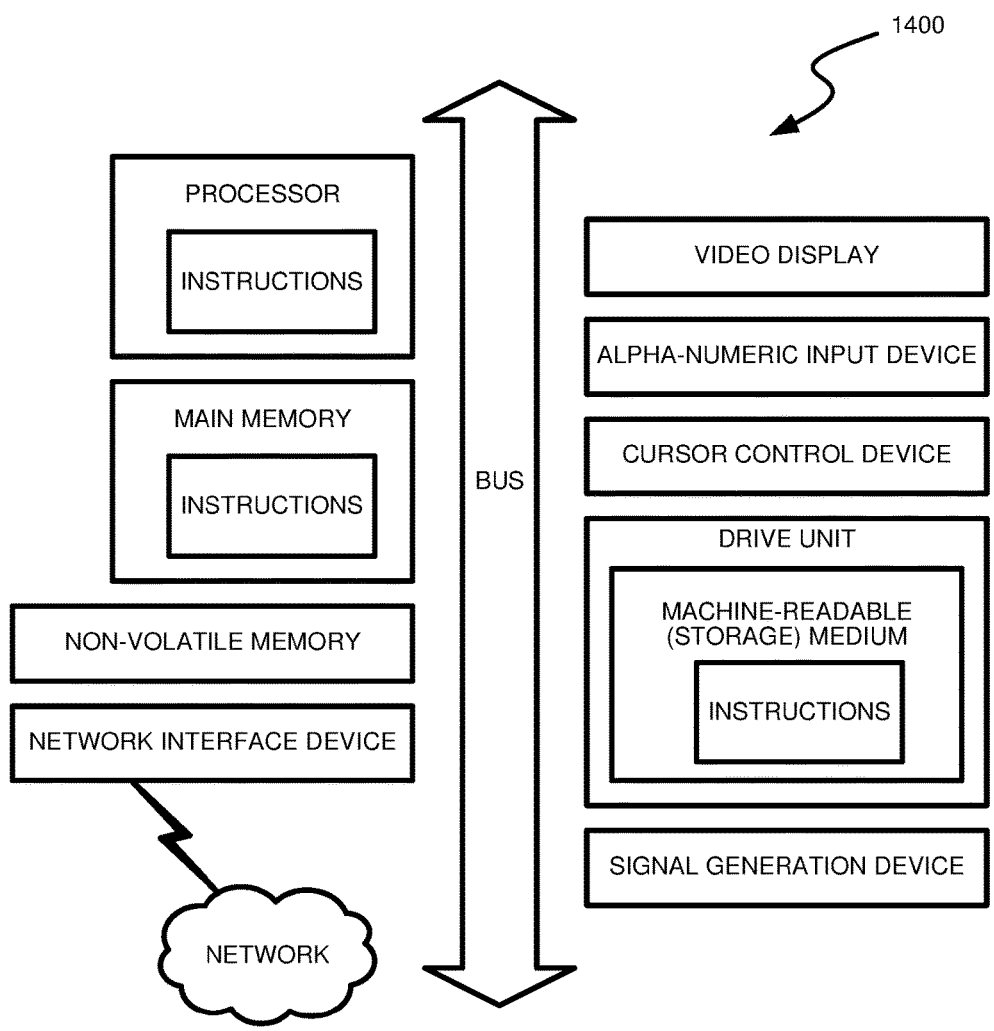
FIG. 14 depicts a diagrammatic representation of a machine, in the example form, of a computer system within which a set of instructions, for causing the machine to perform any one or more of the methodologies discussed herein, may be executed.

FIG. 14 depicts a diagrammatic representation of a machine, in the example form, of a computer system within which a set of instructions, for causing the machine to perform any one or more of the methodologies discussed herein, may be executed.

In the example of FIG. 14, the computer system includes a processor, memory, non-volatile memory, and an interface device. Various common components (e.g., cache memory) are omitted for illustrative simplicity. The computer system 1400 is intended to illustrate a hardware device on which any of the components depicted in the example of FIG. 1 (and any other components described in this specification) can be implemented. For example, the computer system can be any radiating object or antenna array system. The computer system can be of any applicable known or convenient type. The components of the computer system can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1400. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium". A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 14 reside in the interface.

In operation, the computer system 1400 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

The detailed description provided herein may be applied to other systems, not necessarily only the system described above. The elements and acts of the various examples described above can be combined to provide further implementations of the invention. Some alternative implementations of the invention may include not only additional elements to those implementations noted above, but also may include fewer elements. These and other changes can be made to the invention in light of the above Detailed Description. While the above description defines certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention.

What is claimed is:

1. A method of load balancing wireless power receiver clients over multiple retrodirective wireless power transmission systems in a wireless power delivery environment, the method comprising:

identifying transmitter load information associated with at least two geographically diverse wireless power transmission systems of the multiple retrodirective wireless power transmission systems,
wherein each wireless power transmission system is configured to transmit directed wireless power to a wireless power receiver client over multiple paths via multiple adaptively phased antennas;

detecting a load imbalance between the at least two wireless power transmission systems based, at least in part, on the transmitter load information;

determining one or more operations for improving the load imbalance including directing one or more of the at least two wireless power transmission systems to handoff one or more wireless power receiver clients; and directing one or more of the at least two wireless power transmission systems to perform the one or more operations.

2. The method of claim 1, wherein the one or more operations, when performed by a wireless power transmission system, direct the one or more of the at least two wireless power transmission systems to handoff one or more wireless power receiver clients.

3. The method of claim 1, wherein the client load imbalance includes at least one over-utilized wireless power transmission system.

4. The method of claim 3, wherein the one or more operations, when performed by a wireless power transmission system, direct the over-utilized wireless power transmission system to discontinue accepting requests for wireless power from wireless power receiver clients.

5. The method of claim 1, wherein detecting the load imbalance between the at least two wireless power transmission systems further comprises:
measuring the loads of the at least two wireless power transmission systems of the multiple wireless power transmission systems based on the corresponding transmitter load information.

6. The method of claim 5, wherein the loads of the at least two wireless power transmission systems are measured based on a number of devices being serviced.

7. The method of claim 5, wherein the loads of the at least two wireless power transmission systems are measured based on energy requirements of devices being serviced, charging efficiency of the devices being serviced, priorities of the devices being serviced, or locations of the devices being serviced.

8. The method of claim 5, wherein detecting the load imbalance between the at least two wireless power transmission systems further comprises:
comparing the transmitter load information associated with the at least two wireless power transmission systems to identify the load imbalance; and
determining that the load imbalance exceeds a balance threshold.

9. The method of claim 1, further comprising:
monitoring the transmitter load information associated with the multiple wireless power transmission systems.

10. The method of claim 1, further comprising:
coordinating awareness between the at least two wireless power transmission systems.

11. An apparatus comprising:
one or more computer readable storage media; and
program instructions stored on the one or more computer readable storage media, wherein the program instructions, when executed by a processing system, direct the processing system to:
identify transmitter load information associated with at least two wireless power transmission systems of multiple retrodirective wireless power transmission systems in a wireless power delivery environment, wherein each wireless power transmission system is configured to transmit directed wireless power to a wireless power receiver client over multiple paths via multiple antennas;
detect a load imbalance between the at least two wireless power transmission systems based, at least in part, on the transmitter load information;
determine one or more operations for improving the load imbalance including directing one or more of the at least two wireless power transmission systems to handoff one or more wireless power receiver clients; and
direct one or more of the at least two wireless power transmission systems to perform the one or more operations.

12. An apparatus of claim 11, wherein the one or more operations direct the one or more of the at least two wireless power transmission systems to handoff one or more wireless power receiver clients.

13. An apparatus of claim 11, wherein the client load imbalance includes at least one over-utilized wireless power transmission system, and wherein the one or more operations direct the over-utilized wireless power transmission system to discontinue accepting request for wireless power from wireless power receiver clients.

14. An apparatus of claim 11, wherein to detect the load imbalance between the at least two wireless power transmission systems, the program instructions, when executed by a processing system, further direct the processing system to:
measure the loads of the at least two wireless power transmission systems of the multiple wireless power transmission systems based on the corresponding transmitter load information.

15. An apparatus of claim 14, wherein the loads of the at least two wireless power transmission systems are measured based on a number of devices being serviced.

16. An apparatus of claim 14, wherein the loads of the at least two wireless power transmission systems are measured based on energy requirements of devices being serviced, charging efficiency of the devices being serviced, priorities of the devices being serviced, or locations of the devices being serviced.

17. An apparatus of claim 14, wherein to detect the load imbalance between the at least two wireless power transmission systems, the program instructions, when executed by a processing system, further direct the processing system to:
compare the transmitter load information associated with the at least two wireless power transmission systems to identify the load imbalance; and
determine that the load imbalance exceeds a balance threshold.

18. An apparatus of claim 14, wherein the program instructions, when executed by a processing system, further direct the processing system to:
monitor the transmitter load information associated with the multiple wireless power transmission systems.

19. A wireless power transmission system, comprising:
an adaptively-phased antenna array having multiple radio frequency (RF) transceivers;
control circuitry configured to:
identify transmitter load information associated with at least two wireless power transmission systems of multiple retrodirective wireless power transmission systems in a wireless power delivery environment, wherein each wireless power transmission system is configured to transmit directed wireless power to a wireless power receiver client over multiple paths via multiple antennas;
detect a load imbalance between the at least two wireless power transmission systems based, at least in part, on the transmitter load information;
determine one or more operations for improving the load imbalance including directing one or more of the at least two wireless power transmission systems to handoff one or more wireless power receiver clients; and
direct one or more of the at least two wireless power transmission systems to perform the one or more operations.

20. The wireless power transmission system of claim 19, wherein the control system is further configured to direct the one or more of the at least two wireless power transmission systems to handoff one or more wireless power receiver clients.

* * * * *

UNITED STATES PATENT AND TRADEMARK OFFICE
CERTIFICATE OF CORRECTION

PATENT NO. : 10,498,177 B2
APPLICATION NO. : 15/196618
DATED : December 3, 2019
INVENTOR(S) : Hatem Zeine et al.

Page 1 of 1

It is certified that error appears in the above-identified patent and that said Letters Patent is hereby corrected as shown below:

In the Specification

Column 3, Lines 28-29, delete "Systems Over/Architecture" and insert --System Overview/Architecture--

Column 8, Line 37, delete "to"

Column 15, Line 48, delete "request from"

Column 17, Line 2, delete "Iintiated)" and insert --Initiated)--

Signed and Sealed this
First Day of December, 2020

Andrei Iancu
*Director of the United States Patent and Trademark Office*